US012059778B2

(12) United States Patent
Thorson et al.

(10) Patent No.: US 12,059,778 B2
(45) **Date of Patent: *Aug. 13, 2024**

(54) PRECISION TORQUE SCREWDRIVER

(71) Applicant: MILWAUKEE ELECTRIC TOOL CORPORATION, Brookfield, WI (US)

(72) Inventors: Troy C. Thorson, Cedarburg, WI (US); Matthew J. Mergener, Mequon, WI (US); John S. Dey, IV, Milwaukee, WI (US); Toby Lichtensteiger, Port Washington, WI (US); Jacob P. Schneider, Madison, WI (US); Trent Sheffield, Jordan, UT (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,629

(22) Filed: Jun. 13, 2022

(65) Prior Publication Data

US 2022/0305631 A1 Sep. 29, 2022

Related U.S. Application Data

(63) Continuation of application No. 16/433,288, filed on Jun. 6, 2019, now Pat. No. 11,400,570, which is a (Continued)

(51) Int. Cl.

*B25B 23/147* (2006.01)
*B25B 21/00* (2006.01)
*B25B 23/14* (2006.01)

(52) U.S. Cl.

CPC ............ *B25B 23/147* (2013.01); *B25B 21/00* (2013.01); *B25B 23/141* (2013.01)

(58) Field of Classification Search

CPC ..... B25B 23/147; B25B 23/141; B25B 23/14; B25B 23/1425; B25B 21/00; B25B 21/08; (Continued)

(56) References Cited

U.S. PATENT DOCUMENTS 2,889,902 A 6/1959 Harrison et al.
3,174,559 A 3/1965 Vaughn
(Continued)

FOREIGN PATENT DOCUMENTS

DE 8327261 U1 4/1984
JP H04268428 A 9/1992
(Continued)

OTHER PUBLICATIONS

International Search Report and Written Opinion for Application No. PCT/US2016/029355 dated Aug. 19, 2016 (28 pages).
(Continued)

*Primary Examiner* — Robert J Scruggs
(74) *Attorney, Agent, or Firm* — Michael Best & Friedrich LLP

(57) ABSTRACT

A transducer assembly for use in a power tool including a housing, a motor, an output shaft that drives a workpiece about a central axis, and a transmission. The transducer assembly includes a transducer positioned between the motor and the transmission. The transducer including an inner hub being rotationally affixed to the housing, an outer rim affixed to a rotatable component of the transmission, a plurality of webs extending radially outward from the inner hub to the outer rim, and a sensor affixed to each of the webs for detecting strain of each of the webs in response to a reaction torque applied to the transmission from the output shaft. A width of each of the webs gradually tapers from at (Continued)

least one of the outer rim or the inner hub toward a midpoint of each of the webs in a direction perpendicular to the central axis.

20 Claims, 24 Drawing Sheets

Related U.S. Application Data continuation of application No. 15/138,962, filed on Apr. 26, 2016, now Pat. No. 10,357,871.

(60) Provisional application No. 62/292,566, filed on Feb. 8, 2016, provisional application No. 62/275,469, filed on Jan. 6, 2016, provisional application No. 62/153,859, filed on Apr. 28, 2015.

(58) Field of Classification Search
CPC ... B25F 5/001; F16D 7/00; F16D 7/04; F16D 7/044; F16D 7/048; F16H 1/46; F16H 35/10; G01L 5/1627
See application file for complete search history.

(56) References Cited

U.S. PATENT DOCUMENTS

| | | | | |
|---|---|---|---|---|
| 3,263,426 | A | 8/1966 | Skoog | |
| 3,387,669 | A | 6/1968 | Wise, Jr. et al. | |
| 3,419,087 | A | 12/1968 | Amtsberg et al. | |
| 3,477,007 | A | 11/1969 | Ducommun et al. | |
| 3,572,447 | A | 3/1971 | Pauley et al. | |
| 3,596,718 | A | 8/1971 | Fish et al. | |
| 3,616,864 | A | 11/1971 | Sorensen et al. | |
| 3,710,874 | A | 1/1973 | Seccombe et al. | |
| 3,832,897 | A | 9/1974 | Schenck | |
| 3,920,082 | A | 11/1975 | Dudek | |
| 3,962,910 | A | 6/1976 | Spyridakis et al. | |
| 4,016,938 | A | 4/1977 | Rice | |
| 4,066,942 | A | 1/1978 | Bardwell et al. | |
| 4,089,216 | A | 5/1978 | Elias | |
| 4,104,778 | A | 8/1978 | Vliet | |
| 4,106,176 | A | 8/1978 | Rice et al. | |
| 4,163,310 | A | 8/1979 | Sigmund | |
| 4,244,245 | A | 1/1981 | Wallace et al. | |
| 4,344,216 | A | 8/1982 | Finkelston | |
| 4,375,120 | A | 3/1983 | Sigmund | |
| 4,375,121 | A | 3/1983 | Sigmund | |
| 4,375,122 | A | 3/1983 | Sigmund | |
| 4,375,123 | A | 3/1983 | Ney | |
| 4,413,396 | A | 11/1983 | Wallace et al. | |
| 4,418,590 | A | 12/1983 | Dubiel et al. | |
| 4,485,682 | A | 12/1984 | Stroezel et al. | |
| 4,487,270 | A | 12/1984 | Huber | |
| 4,510,424 | A | 4/1985 | Doniwa | |
| 4,562,389 | A | 12/1985 | Jundt et al. | |
| 4,571,696 | A | 2/1986 | Bitzer | |
| 4,620,449 | A | 11/1986 | Borries et al. | |
| 4,620,450 | A | 11/1986 | Yamaguchi | |
| 4,759,225 | A | 7/1988 | Reynertson et al. | |
| 4,772,186 | A | 9/1988 | Pyles et al. | |
| 4,782,725 | A | 11/1988 | Spaulding | |
| 4,822,215 | A | 4/1989 | Alexander | |
| 4,873,453 | A | 10/1989 | Schmerda et al. | |
| 4,987,806 | A | 1/1991 | Lehnert | |
| 5,014,793 | A | 5/1991 | Germanton et al. | |
| 5,014,794 | A | 5/1991 | Germanton et al. | |
| 5,081,385 | A | 1/1992 | Gajjar | |
| 5,083,068 | A | 1/1992 | Neef | |
| 5,154,242 | A | 10/1992 | Soshin et al. | |
| 5,172,774 | A | 12/1992 | Melrose | |
| 5,215,270 | A | 6/1993 | Udocon et al. | |
| 5,285,857 | A | 2/1994 | Shimada | |
| 5,311,108 | A | 5/1994 | Willard | |
| 5,315,501 | A | 5/1994 | Whitehouse | |
| 5,404,775 | A | 4/1995 | Abe | |
| 5,442,965 | A | 8/1995 | Halén | |
| 5,526,460 | A | 6/1996 | DeFrancesco et al. | |
| 5,533,410 | A | 7/1996 | Smith | |
| 5,637,968 | A | 6/1997 | Kainec et al. | |
| 5,650,573 | A | 7/1997 | Bruns et al. | |
| 5,689,159 | A | 11/1997 | Culp et al. | |
| 5,739,605 | A | 4/1998 | Lazorchak | |
| 5,784,935 | A | 7/1998 | Korinek | |
| 5,889,922 | A | 3/1999 | Bufe et al. | |
| 5,894,094 | A * | 4/1999 | Kuchler | G01L 5/1627 73/146 |
| 5,897,454 | A | 4/1999 | Cannaliato | |
| 5,898,598 | A | 4/1999 | Szwast et al. | |
| 5,918,201 | A | 6/1999 | Szwast et al. | |
| 5,963,707 | A | 10/1999 | Carr | |
| 6,134,973 | A | 10/2000 | Schoeps | |
| 6,161,629 | A | 12/2000 | Hohmann et al. | |
| 6,341,533 | B1 | 1/2002 | Schoeps | |
| 6,347,554 | B1 | 3/2002 | Klingler | |
| 6,378,623 | B2 | 4/2002 | Kawarai | |
| 6,516,896 | B1 | 2/2003 | Bookshar et al. | |
| 6,536,536 | B1 | 3/2003 | Gass et al. | |
| 6,616,446 | B1 | 9/2003 | Schmid | |
| 6,868,742 | B2 | 3/2005 | Schoeps | |
| 6,962,088 | B2 | 11/2005 | Horiuchi | |
| 6,964,205 | B2 | 11/2005 | Papakostas et al. | |
| 7,062,979 | B2 | 6/2006 | Day et al. | |
| 7,082,865 | B2 | 8/2006 | Reynertson, Jr. | |
| 7,090,030 | B2 | 8/2006 | Miller | |
| 7,210,541 | B2 | 5/2007 | Miller | |
| 7,234,378 | B2 | 6/2007 | Reynertson, Jr. | |
| 7,249,526 | B2 | 7/2007 | Hsieh | |
| 7,258,026 | B2 | 8/2007 | Papakostas et al. | |
| 7,275,450 | B2 | 10/2007 | Hirai et al. | |
| 7,410,006 | B2 | 8/2008 | Zhang et al. | |
| 7,552,781 | B2 | 6/2009 | Zhang et al. | |
| 7,770,658 | B2 | 8/2010 | Ito et al. | |
| 7,779,704 | B1 | 8/2010 | Chu | |
| 7,886,635 | B2 | 2/2011 | Kaneyama et al. | |
| 7,900,715 | B2 | 3/2011 | Chen | |
| 7,942,211 | B2 | 5/2011 | Scrimshaw et al. | |
| 8,025,106 | B2 | 9/2011 | Schmidt | |
| 8,171,827 | B2 | 5/2012 | Gareis | |
| 8,264,374 | B2 | 9/2012 | Obatake et al. | |
| 8,302,702 | B2 * | 11/2012 | Hansson | B25B 23/147 173/180 |
| 8,316,958 | B2 | 11/2012 | Schell et al. | |
| 8,353,363 | B2 | 1/2013 | Hirt et al. | |
| RE44,311 | E | 6/2013 | Zhang et al. | |
| 8,505,415 | B2 | 8/2013 | Hanspers et al. | |
| 8,522,650 | B2 | 9/2013 | Tatsuno | |
| RE44,993 | E | 7/2014 | Vanko et al. | |
| RE45,112 | E | 9/2014 | Zhang et al. | |
| 8,905,895 | B2 | 12/2014 | Scalf et al. | |
| 9,212,725 | B2 | 12/2015 | Steckel et al. | |
| 9,281,770 | B2 | 3/2016 | Wood et al. | |
| 9,352,456 | B2 | 5/2016 | Murthy et al. | |
| 10,252,388 | B2 | 4/2019 | Takahashi | |
| 10,357,871 | B2 * | 7/2019 | Thorson | B25B 23/141 |
| 2002/0037785 | A1 | 3/2002 | Wissmach et al. | |
| 2002/0066632 | A1 | 6/2002 | Kristen et al. | |
| 2003/0009262 | A1 | 1/2003 | Colangelo, III et al. | |
| 2003/0173096 | A1 | 9/2003 | Setton et al. | |
| 2004/0182587 | A1 | 9/2004 | May et al. | |
| 2007/0144753 | A1 | 6/2007 | Miller | |
| 2008/0127711 | A1 | 6/2008 | Farag | |
| 2009/0102407 | A1 | 4/2009 | Klemm et al. | |
| 2009/0139738 | A1 | 6/2009 | Lippek | |
| 2010/0116519 | A1 | 5/2010 | Gareis | |
| 2010/0139432 | A1 | 6/2010 | Steckel et al. | |
| 2011/0036189 | A1 | 2/2011 | Hausseecker et al. | |
| 2011/0127059 | A1 | 6/2011 | Limberg et al. | |
| 2011/0185864 | A1 | 8/2011 | Ide | |
| 2011/0259703 | A1 | 10/2011 | Kuwabara | |
| 2012/0085562 | A1 | 4/2012 | Elsmark | |
| 2012/0318550 | A1 | 12/2012 | Tanimoto et al. | |
| 2013/0037288 | A1 | 2/2013 | Schell et al. | |
| 2013/0105189 | A1 | 5/2013 | Murthy et al. | |

(56) References Cited

U.S. PATENT DOCUMENTS

| | | | | |
|---|---|---|---|---|
| 2013/0133912 | A1 | 5/2013 | Mizuno et al. | |
| 2013/0193891 | A1 | 8/2013 | Wood et al. | |
| 2013/0333910 | A1 | 12/2013 | Tanimoto et al. | |
| 2014/0011621 | A1 * | 1/2014 | Steckel | F16H 1/28 475/331 |
| 2014/0026723 | A1 | 1/2014 | Persson et al. | |
| 2014/0090224 | A1 | 4/2014 | Khalaf et al. | |
| 2014/0102741 | A1 | 7/2014 | Sekino et al. | |
| 2016/0318165 | A1 | 11/2016 | Thorson et al. | |
| 2018/0001446 | A1 | 1/2018 | Elsmark | |

FOREIGN PATENT DOCUMENTS

| | | | |
|---|---|---|---|
| WO | 00071302 | A1 | 11/2000 |
| WO | 2008028765 | A | 3/2008 |
| WO | 2010065856 | A1 | 6/2010 |
| WO | 2012134474 | A1 | 10/2012 |

OTHER PUBLICATIONS

Extended European Search Report for Application No. 20188758.5 dated Oct. 27, 2020 (8 pages).

* cited by examiner

PRECISION TORQUE SCREWDRIVER

CROSS-REFERENCE TO RELATED APPLICATIONS

This application is a continuation of U.S. patent application Ser. No. 16/433,288 filed on Jun. 6, 2019, now U.S. Pat. No. 11,400,570, which is a continuation of U.S. patent application Ser. No. 15/138,962 filed on Apr. 26, 2016, now U.S. Pat. No. 10,357,871, which claims priority to U.S. Provisional Patent Application No. 62/153,859 filed on Apr. 28, 2015, U.S. Provisional Patent Application No. 62/275,469 filed on Jan. 6, 2016, and U.S. Provisional Patent Application No. 62/292,566 filed on Feb. 8, 2016, the entire contents of all of which are incorporated herein by reference.

FIELD OF THE INVENTION

The present invention relates to a power tool, and more particularly to a screwdriver.

BACKGROUND OF THE INVENTION

A rotary power tool, such as a screwdriver, typically includes a mechanical clutch for limiting an amount of torque that can be applied to a fastener. Such a mechanical clutch, for example, includes a user-adjustable collar for selecting one of a number of incrementally different torque settings for operating the tool. While such a mechanical clutch is useful for increasing or decreasing the torque output of the tool, it is not particularly useful for delivering precise applications of torque during a series of fastener-driving operations.

SUMMARY OF THE INVENTION

The invention provides, in one aspect, a transducer assembly for use in a power tool including a housing, a motor, an output shaft that drives a workpiece about a central axis, and a transmission for transferring torque from the motor to the output shaft. The transducer assembly including a transducer positioned between the motor and the transmission. The transducer includes an inner hub being rotationally affixed to the housing, an outer rim spaced radially outward from the inner hub and affixed to a rotatable component of the transmission, such that the outer rim is configured to rotate relative to the inner hub, a plurality of flexible webs extending radially outward from the inner hub to the outer rim, the flexible webs are angularly spaced apart from each other in equal increments about the central axis, and a sensor affixed to each of the flexible webs for detecting strain of each of the flexible webs in response to a reaction torque applied to the transmission from the output shaft. A width of each of the flexible webs gradually tapers from at least one of the outer rim or the inner hub toward a midpoint of each of the flexible webs in a direction perpendicular to the central axis.

The invention provides, in another aspect, a rotary power tool including a housing, a motor, an output shaft that receives torque from the motor, a transmission positioned between the motor and the output shaft, and a bracket affixed to the housing and disposed coaxially with a central axis of the motor, the output shaft, and the transmission. A protrusion extends away from the bracket and is oriented parallel to the central axis. The rotary power tool further includes a transducer having an inner hub having a central aperture that surrounds a drive shaft of the motor and an offset aperture that aligns with and receives the protrusion, an outer rim affixed to a rotatable component of the transmission, a flexible web interconnecting the inner hub to the rim, and a sensor affixed to the flexible web for detecting strain of the flexible web in response to a reaction torque applied to the transmission from the output shaft. A width of the flexible web gradually tapers from at least one of the outer rim and the inner hub toward a midpoint of the flexible web in a direction perpendicular to the central axis.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
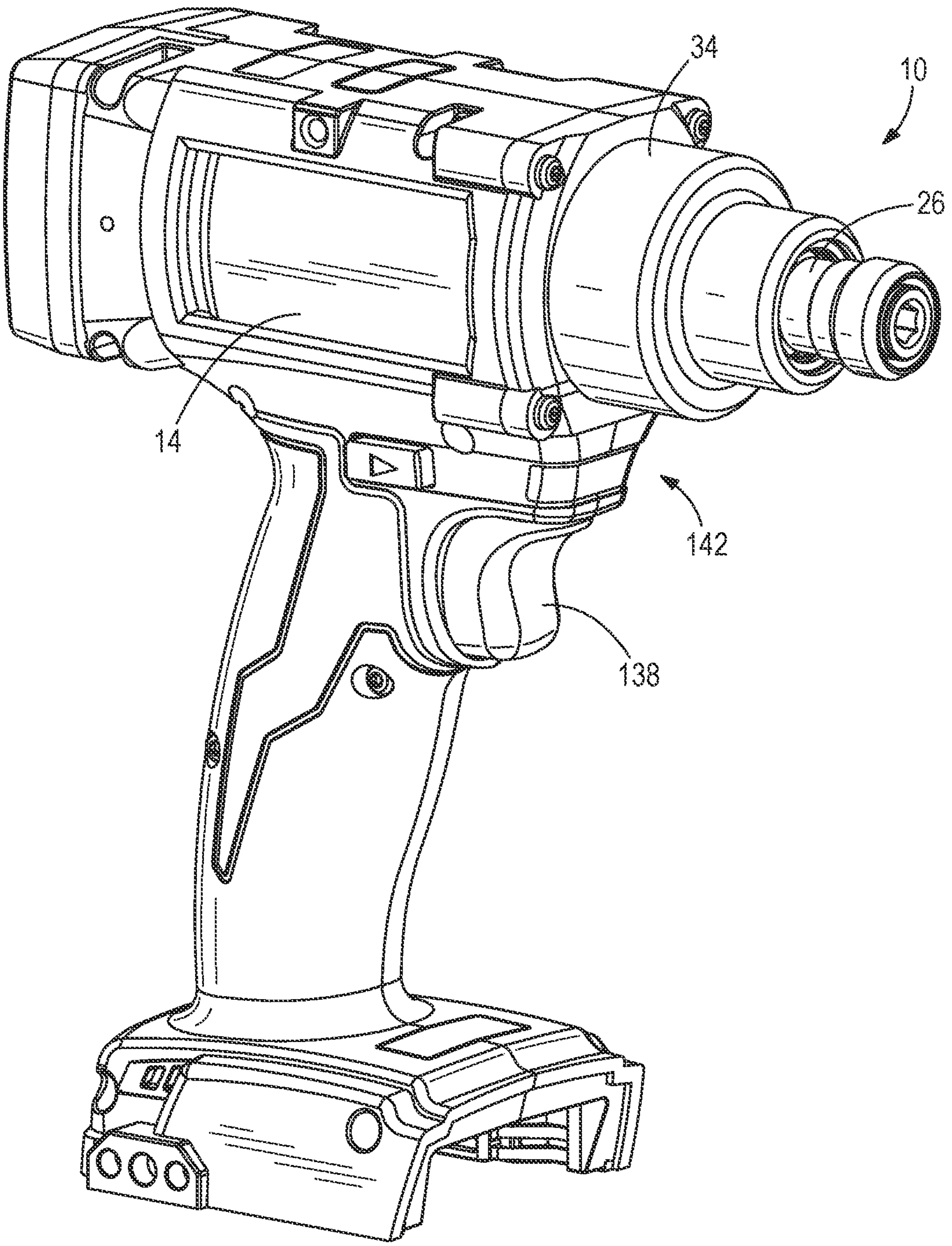
FIG. 1 is a perspective view of a rotary power tool incorporating a transducer assembly in accordance with an embodiment of the invention.
Figure 2:
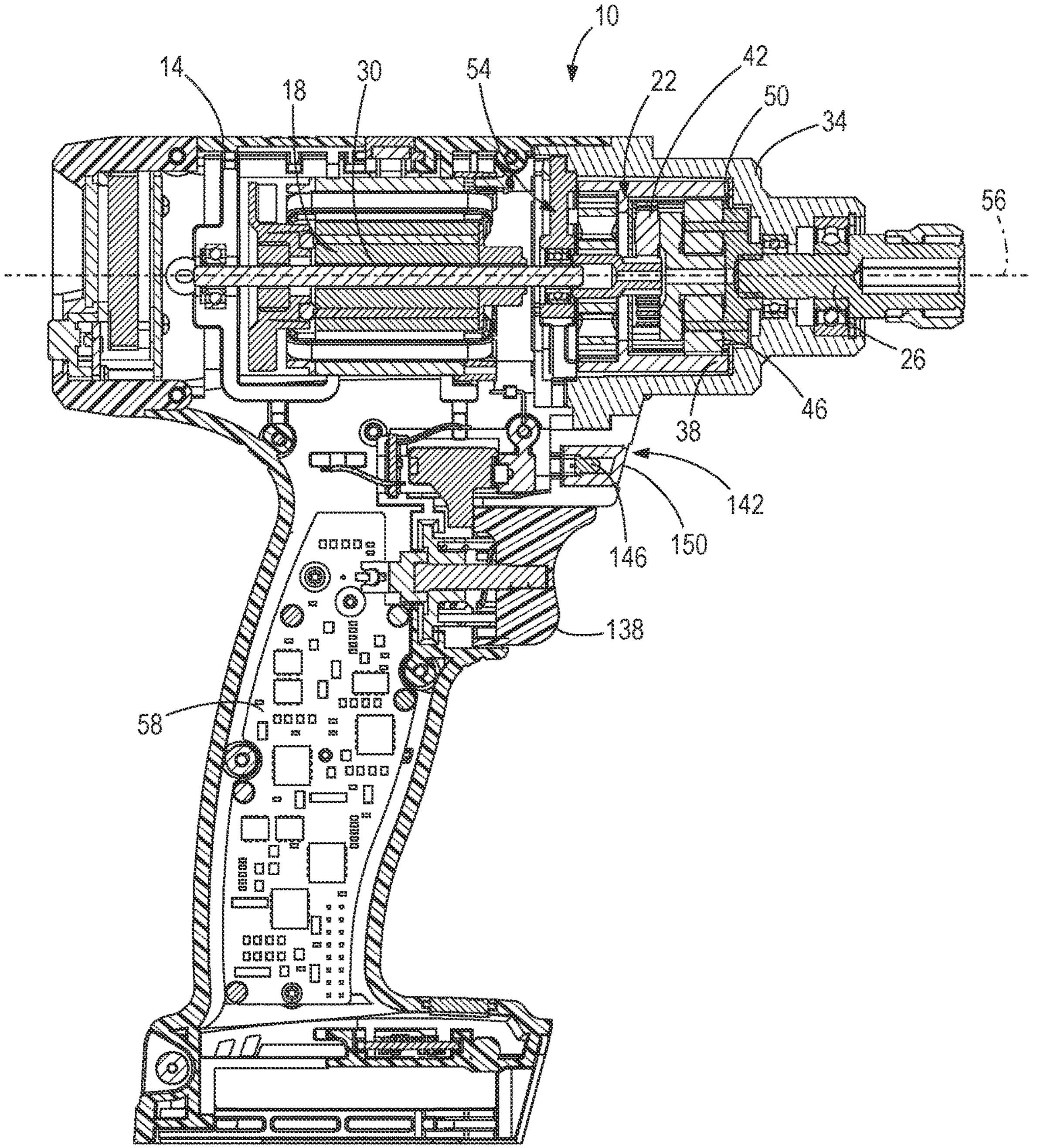
FIG. 2 is a cross-sectional view of the power tool along line 2-2 in FIG. 1.

FIGS. 1 and 2 illustrate a rotary power tool 10 (e.g., a screwdriver) including a main housing 14, a motor 18 positioned within the main housing 14, a multi-stage planetary transmission 22 that receives torque from the motor 18, and an output spindle 26 coupled for co-rotation with the output of the transmission 22. Although not shown, a tool bit may be secured to the spindle 26 using, for example, a quick-release mechanism (also not shown) for performing work on a workpiece.

In the illustrated embodiment of the tool 10, the motor 18 is a brushless electric motor capable of producing a rotational output through a drive shaft 30 (FIG. 2) which, in turn, provides a rotational input to the transmission 22. The transmission 22 includes a transmission housing 34 affixed to the main housing 14, a ring gear 38 positioned within the transmission housing 34, and two planetary stages 42, 46, though any number of planetary stages may alternatively be used. The output spindle 26 is coupled for co-rotation with a carrier 50 in the second planetary stage 46 of the transmission 22 to thereby receive the torque output of the transmission 22.

Figure 3:
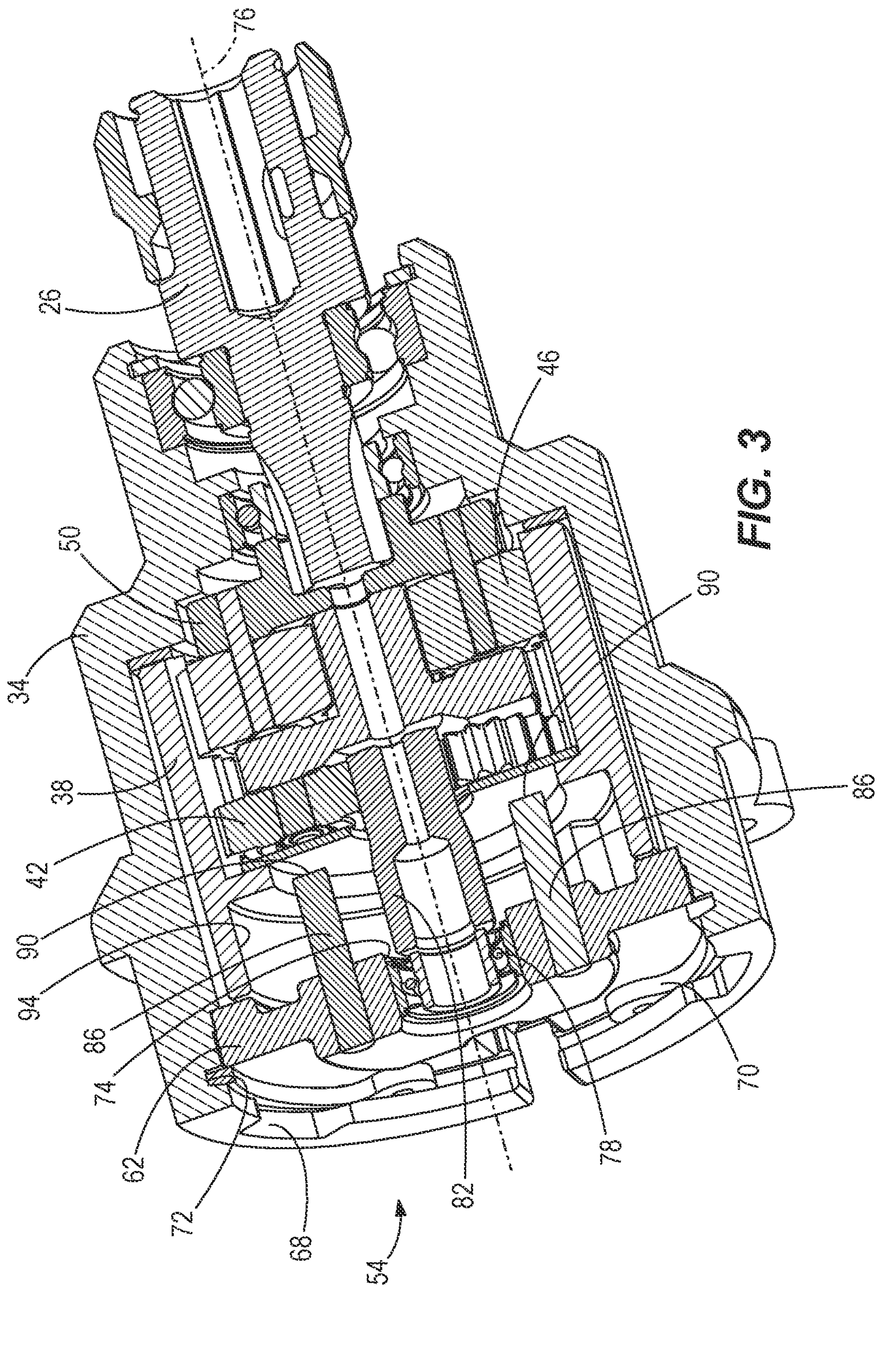
FIG. 3 is an enlarged cross-sectional view of a portion of the power tool along line 2-2 in FIG. 1.
Figure 4:
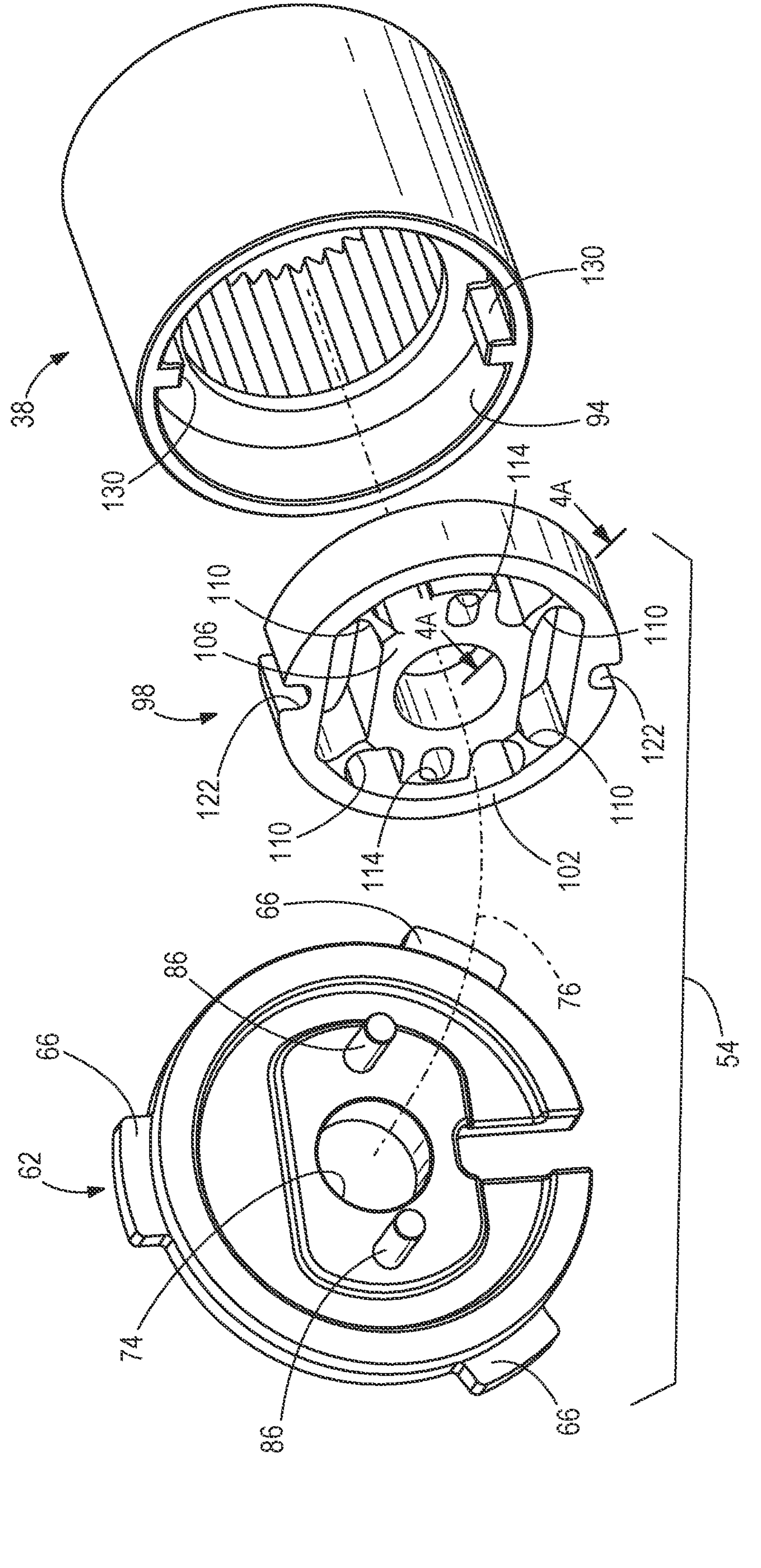
FIG. 4 is an exploded, perspective view of the transducer assembly and a ring gear of the power tool of FIG. 1.

With reference to FIG. 4, the tool 10 also includes a transducer assembly 54 positioned inline and coaxial with a rotational axis 56 (FIG. 2) of the motor 18, transmission 22, and output spindle 26. As explained in further detail below, the transducer assembly 54 detects the torque output by the spindle 26 and interfaces with the motor 18 (i.e., through a high-level or master controller 58, shown in FIG. 2) to control the rotational speed of the motor 18 as the torque output approaches a pre-defined torque value or torque threshold. Referring to FIGS. 3 and 4, the transducer assembly 54 includes a bracket 62 rotationally affixed to the transmission housing 34. In the illustrated embodiment of the tool 10, the bracket 62 includes three radially outward-extending tabs 66 spaced equally about the outer periphery of the bracket 62 that are received in corresponding slots 68 (one of which is shown in FIG. 3) in an end face of the transmission housing 34. Alternatively, the tabs 66 may each have an involute shape to facilitate centering and/or fixing the bracket 62 within the transmission housing 34. A retaining ring 70 is positioned within an associated circumferential groove 72 in the transmission housing 34 for prohibiting axial movement of the bracket 62 and the ring gear 38 within the transmission housing 34.

As shown in FIG. 3, the bracket 62 further includes a central aperture 74 coaxial with a central axis 76 of the bracket 62 in which a bearing 78 is positioned for rotatably supporting the drive shaft 30 of the motor 18 which, in turn, is attached to a pinion 82 engaged with the first planetary stage 42. The bracket 62 also includes two axially extending protrusions 86 radially offset from the central axis 76 in opposite directions (see also FIG. 4). Each of the protrusions 86 has an arcuate outer periphery, the purpose of which is described in further detail below. And, each of the protrusions 86 has a distal end portion 90 positioned within an annular cavity 94 defined within the ring gear 38. In the illustrated embodiment of the transducer assembly 54, the protrusions 86 are configured as cylindrical pins press or interference-fit with corresponding apertures in the bracket 62. Alternatively, the protrusions 86 may have any of a number of different shapes, provided that each protrusion 86 has a segment located within the ring gear cavity 94 with an arcuate outer periphery. As a further alternative, the bracket 62 may include more or fewer than two protrusions 86.

With reference to FIG. 4, the transducer assembly 54 also includes a transducer 98 having an outer rim 102, an inner hub 106, and multiple webs 110 interconnecting the outer rim 102 and the inner hub 106. Similar to the bracket 62, the inner hub 106 of the transducer 98 is coaxial with the central axis 76 and includes a pair of axially extending, oblong holes 114 radially offset from the central axis 76 in opposite directions in which the respective protrusions 86 are received. Alternatively, the inner hub 106 may include more or fewer than two oblong holes 114; however, the number and angular positions of the oblong holes 114 must correspond with the number and angular positions of the protrusions 86 on the bracket 62. In the illustrated embodiment of the transducer assembly 54, the holes 114 are defined by a pair of opposed wall segments 118 (FIGS. 5 and 5A) that are substantially flat. As a result, each of the protrusions 86 is in substantially line contact with at least one of the wall segments 118 in each of the holes 114. In other words, the protrusions 86 and the holes 114 are shaped to provide physical contact between the protrusions 86 and the holes 114 along a line coinciding with a thickness of the inner hub 106. Alternatively, the wall segments 118 may include an arcuate shape having a radius R2 greater than the radius R1 of the outer periphery of each of the protrusions 86 (i.e., the cylindrical pins shown in FIG. 5B), also resulting in line contact between the protrusions 86 and the holes 114.

Figure 5:
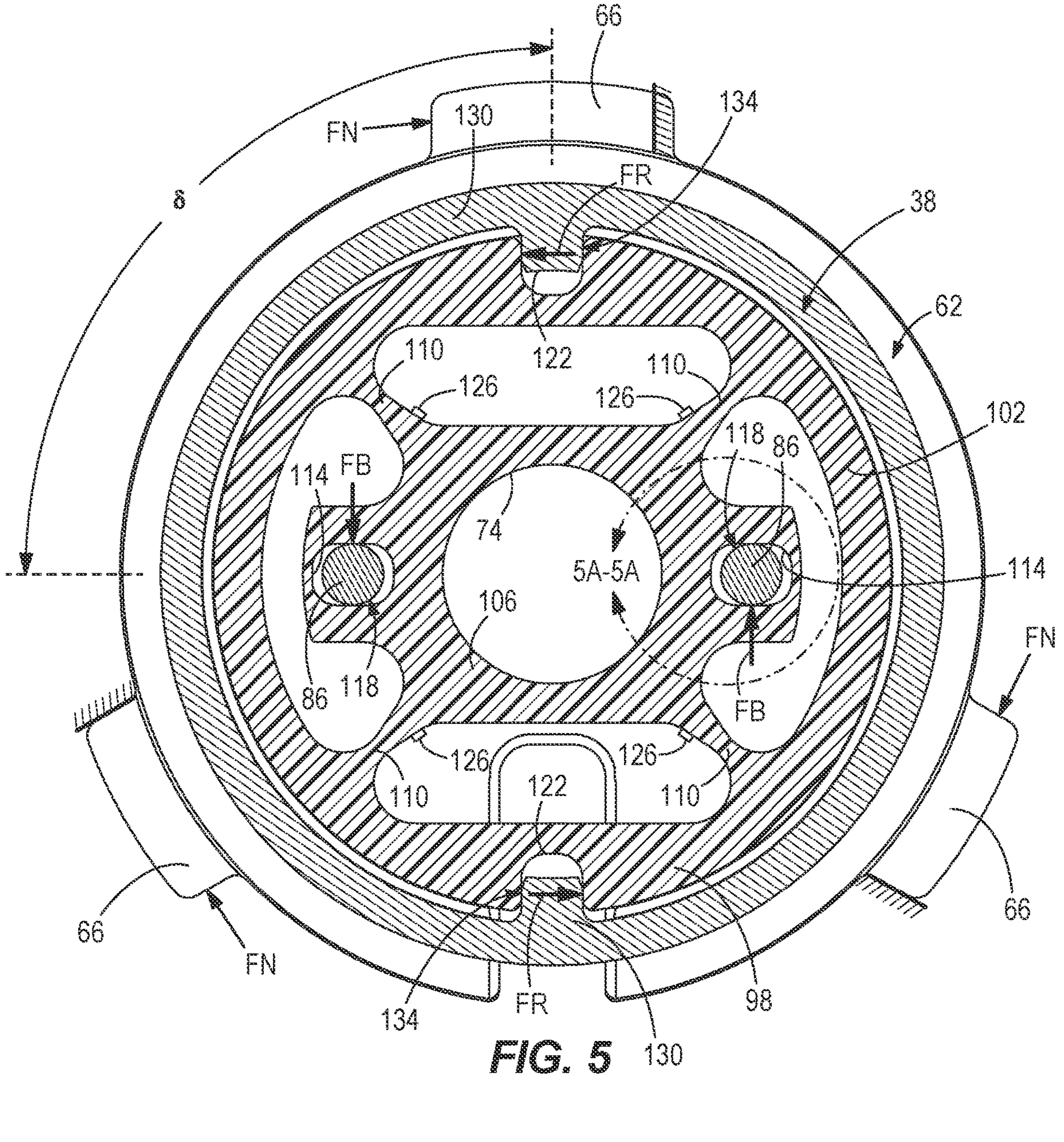
FIG. 5 is a plan view of the transducer assembly and the ring gear of the power tool of FIG. 1, illustrating forces applied to a transducer of the transducer assembly during operation of the power tool.
Figure 5A:
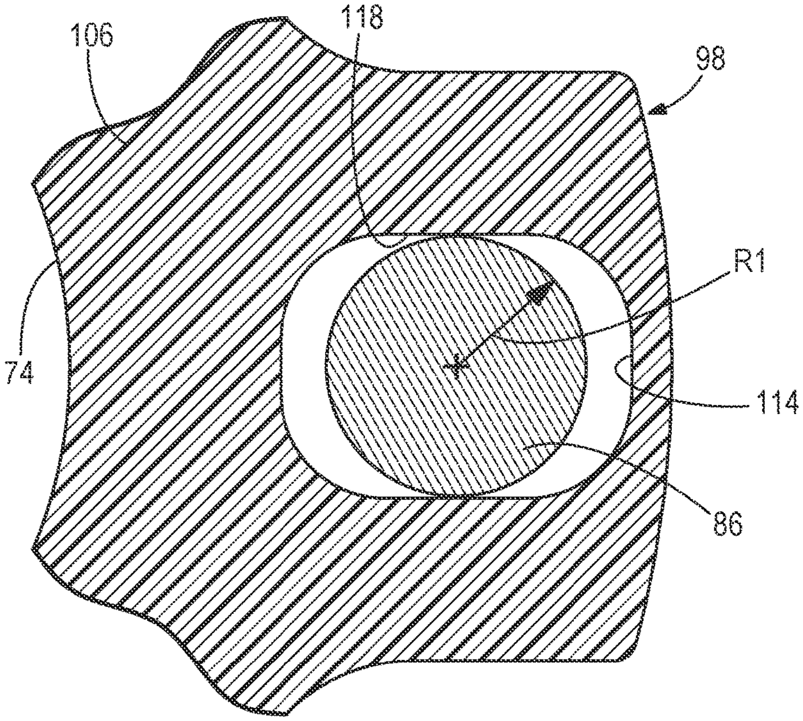
FIG. 5A is an enlarged plan view of the transducer assembly of FIG. 5, illustrating an aperture and a protrusion.
Figure 5B:
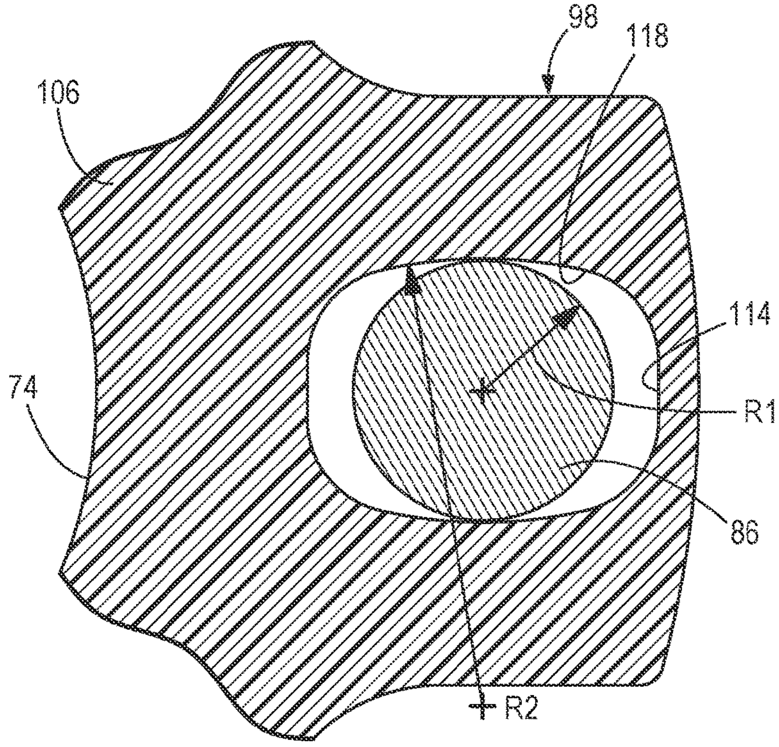
FIG. 5B is an enlarged plan view of the transducer assembly of FIG. 5, but incorporating an aperture having a different configuration in accordance with another embodiment of the invention.

With reference to FIGS. 4 and 5, the outer rim 102 of the transducer 98 is generally circular and defines a circumference interrupted by a pair of radially inward-extending slots 122. In the illustrated embodiment of the transducer assembly 54, the slots 122 are angularly offset from the oblong holes 114 by an angle δ of 90 degrees (FIG. 5). Alternatively, the slots 122 may be angularly offset from the oblong holes 114 by any oblique angle between 0 degrees and 90 degrees.

As a further alternative, the slots 122 may be angularly aligned with the oblong holes 114 such that the slots 122 and the holes 114 may be bisected by a single plane. Although the illustrated transducer 98 includes a pair of slots 122 in the outer rim 102, more or fewer than two slots 122 may alternatively be defined in the outer rim 102.

Figure 4A:
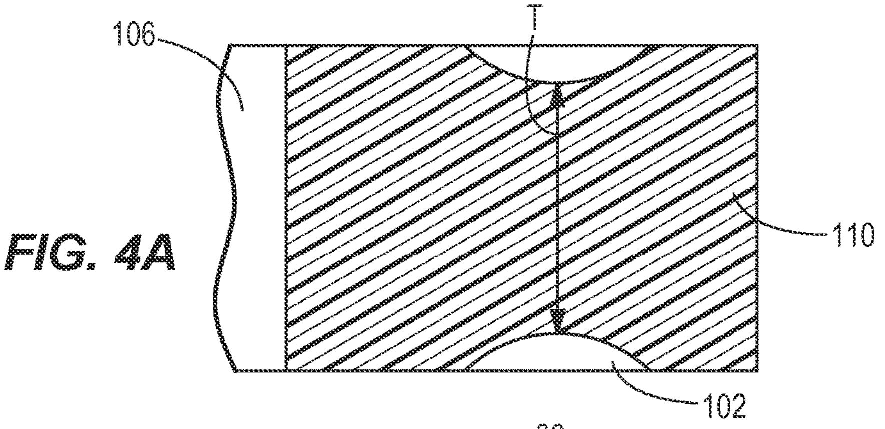
FIG. 4A is a cross-sectional view along line 4A-4A in FIG. 4.

With reference to FIGS. 4 and 5, the webs 110 are configured as thin-walled members extending radially outward from the inner hub 106 to the outer rim 102. In the illustrated embodiment of the transducer assembly 54, the transducer 98 includes four webs 110 angularly spaced apart in equal increments of 90 degrees. As shown in FIG. 4A, the thickness T of the webs 110 (i.e., measured in a direction parallel with the central axis 76) is less than the thickness of the inner hub 106 and the outer rim 102. More particularly, the thickness T of each of the webs 110 gradually tapers from the inner hub 106 toward the midpoint of web 110. Likewise, the thickness T of each of the webs 110 gradually tapers from the outer rim 102 toward the midpoint of web 110. Accordingly, the thickness T of each of the webs 110 has a minimum value coinciding with the midpoint of the web 110.

With reference to FIG. 5, the transducer 98 also includes a sensor (e.g., a strain gauge 126) coupled to each of the webs 110 (e.g., by using an adhesive, for example) for detecting strain experienced by the webs 110. As described in further detail below, the strain gauges 126 are electrically connected to the high-level or master controller 58 for transmitting respective voltage signals generated by the strain gauges 126 proportional to the magnitude of strain experienced by the respective webs 110. These signals are calibrated to a measure of reaction torque applied to the outer rim 102 of the transducer 98 during operation of the power tool 10, which is indicative of the torque applied to a workpiece (e.g., a fastener) by the output spindle 26.

With reference to FIGS. 4 and 5, the ring gear 38 includes a pair of radially inward-extending protrusions 130 positioned in the cavity 94 and radially offset from the central axis 76 in opposite directions. Alternatively, the outer rim 102 may include more or fewer than two slots 122; however, the number and angular position of the slots 122 must at least correspond with the number and angular position of the radially inward-extending protrusions 130 on the ring gear 38. For example, the outer rim 102 may include any multiple of the number of slots 122 as the number of protrusions 130 on the ring gear 38 to facilitate locking the transducer 98 relative to the ring gear 38 and the bracket 62. As shown in FIG. 5, the radially inward-extending protrusions 130 on the ring gear 38 are partially received within the respective slots 122 defined in the outer rim 102. Each of the protrusions 130 is in substantially line contact with one wall segment 134 of the corresponding slot 122. In other words, the radially inward-extending protrusions 130 and the slots 122 are shaped to provide physical contact between the protrusions 130 and the slots along a line coinciding with a thickness of the outer rim 102.

With reference to FIGS. 1 and 2, the tool 10 also includes a worklight 142 configured to illuminate a workpiece and the surrounding workspace. The worklight 142 is in electrical communication with and selectively actuated by the high-level or master controller 58, and is disposed at the forward end of the tool 10 between the trigger 138 and the transmission housing 34. In the illustrated embodiment, the worklight 142 includes a light emitting diode (i.e., LED 146) and a cover 150 that shields the LED 146 (FIG. 2). In some embodiments, the cover 150 may function as a lens to focus or diffuse light emitted by the LED 146 towards the workpiece and the surrounding workspace. In the illustrated embodiment of the tool 10, the LED 146 is configured as a multi-color LED 146 (e.g., an RGB LED), which is operable by the controller 58 to illuminate in one of many different colors. Alternatively, the LED 146 may be configured to emit only a single color (e.g., white). Although the illustrated worklight 142 includes a single LED 146, the worklight 142 may alternatively include multiple multi-color or single-color LEDs.

During operation, when the motor 18 is activated (e.g., by depressing a trigger 138, shown in FIGS. 1 and 2), torque is transferred from the drive shaft 30, through the planetary transmission 22, and to the output spindle 26 for rotating a tool bit attached to the output spindle 26. When the tool bit is engaged with and driving a workpiece (e.g., a fastener), a reaction torque is applied to the output spindle 26 in an opposite direction as the output spindle 26 is rotating. This reaction torque is transferred through the planetary stages 42, 46 to the ring gear 38, where it is applied to the outer rim 102 of the transducer 98 by force components $F_R$, which are equal in magnitude, radially offset from the central axis 76 by the same amount, and extend in opposite directions from the frame of reference of FIG. 5.

The force components $F_R$ acting on the outer rim 102 apply a moment to the transducer 98 about the central axis 76, which is resisted by the bracket 62. Particularly, the moment is applied to the protrusions 86 extending from the bracket 62 by force components $F_B$, which are equal in magnitude, radially offset from the central axis 76 by the same amount, and extend in opposite directions from the frame of reference of FIG. 5. However, because the bracket 62 is fixed within the transmission housing 34, the inner hub 106 is prevented from angular displacement due to the normal forces FN applied to the tabs 66 by the transmission housing 34.

As the reaction torque applied to the outer ring gear 38 increases, the magnitude of the force components $F_R$ also increases, eventually causing the webs 110 to deflect and the outer rim 102 to be displaced angularly relative to the inner hub 106 by a small amount. As the magnitude of the force components $F_R$ continues to increase, the deflection of the webs 110 and the relative angular displacement between the outer rim 102 and the inner hub 106 progressively increases. The strain experienced by the webs 110 as a result of being deflected is detected by the strain gauges 126 which, in turn, output respective voltage signals to the high-level or master controller 58 in the power tool 10. As described above, these signals are calibrated to a measure of reaction torque applied to the outer rim 102 of the transducer 98, which is indicative of the torque applied to the workpiece by the output spindle 26.

Because the force components $F_R$ are applied to the outer rim 102 by line contact and the force components $F_B$ are applied to the bracket 62 (via the protrusions 86) by line contact, more consistent measurements of strain are achievable amongst the four strain gauges 126 attached to the respective webs 110, thereby resulting in a more accurate measurement of reaction torque applied to the ring gear 38, and therefore the torque applied to the workpiece by the output spindle 26. In other words, if either of the force components $F_R$, $F_B$ were distributed over an area of the slots 122 or the holes 114, such distribution is unlikely to be consistent between the two slots 122 or the two holes 114. Consequently, the inner hub 106 might become skewed or offset relative to the central axis 76, causing one or more of the webs 110 to deflect more than the others. Such inconsistency in deflection of the webs 110 would ultimately result in an inaccurate measurement of reaction torque applied to the ring gear 38.

Figure 6:
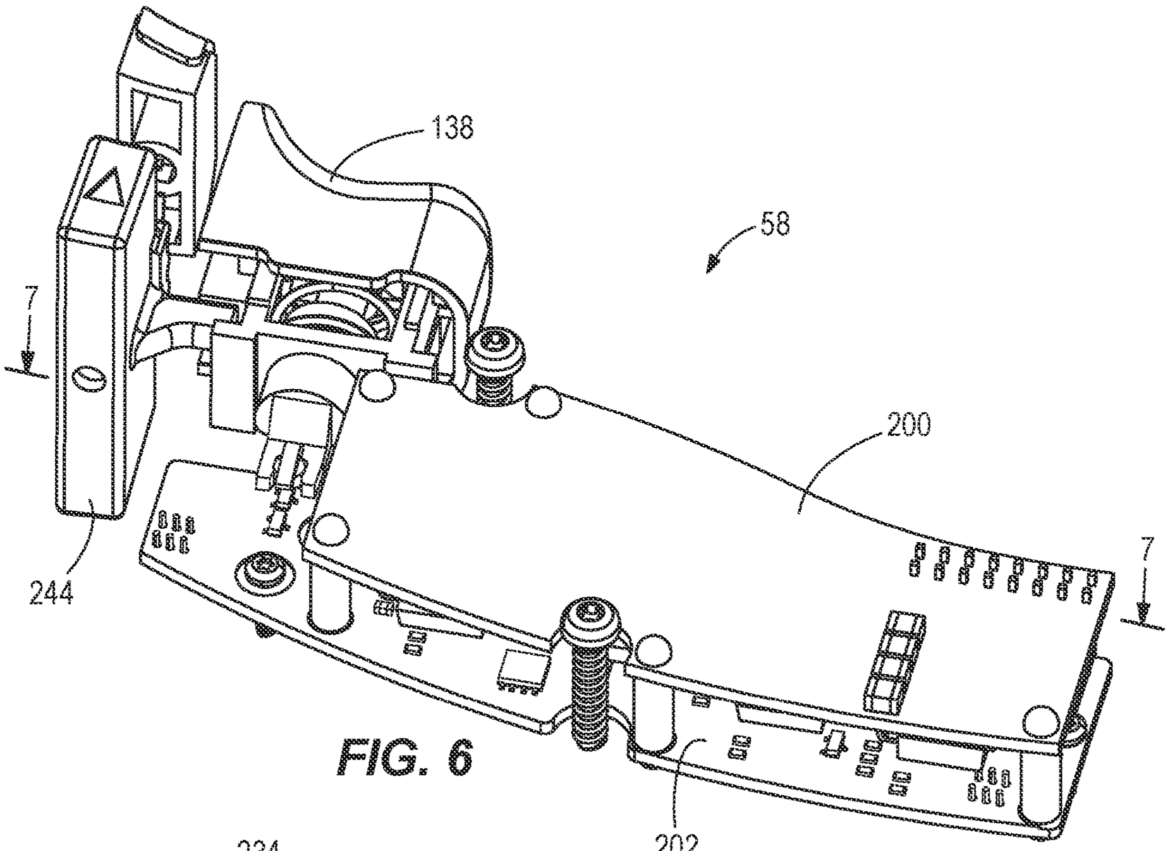
FIG. 6 is a perspective view of a controller of the power tool of FIG. 1.
Figure 7:
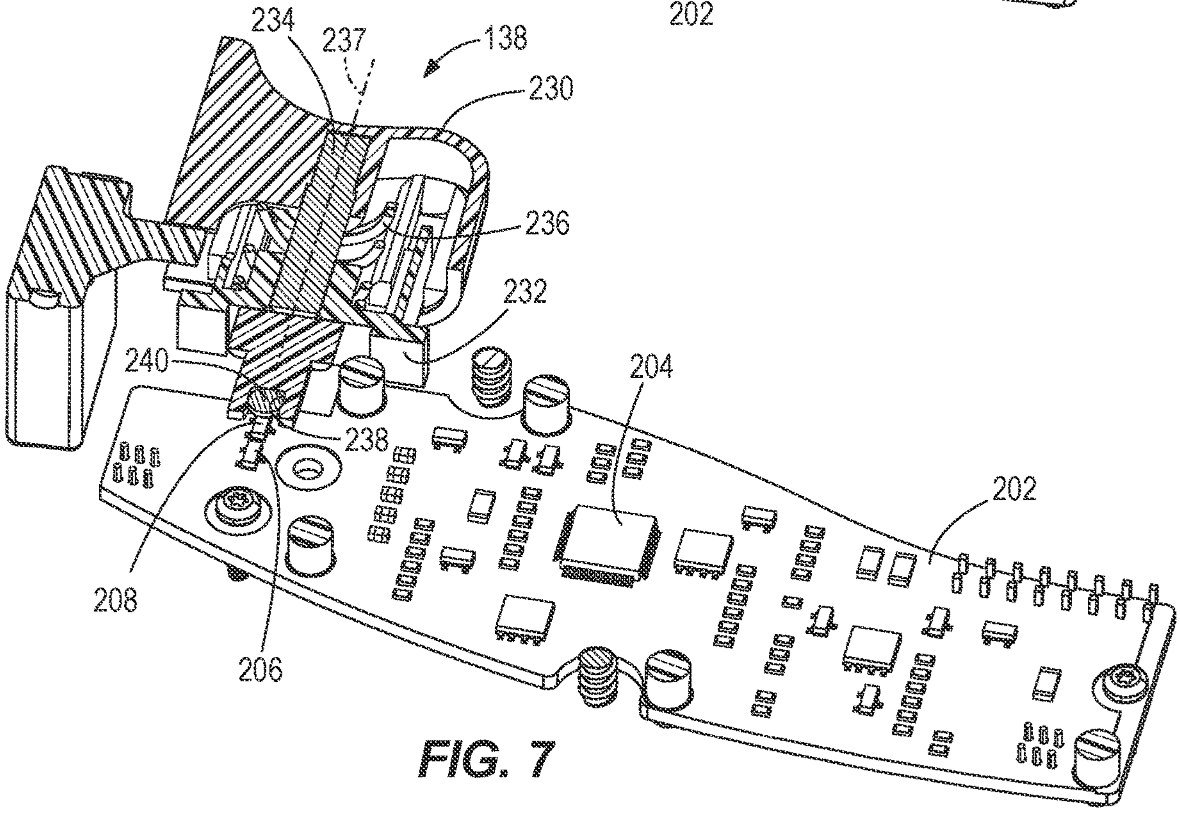
FIG. 7 is a perspective view of the controller of FIG. 6, with portions removed.
Figure 8:
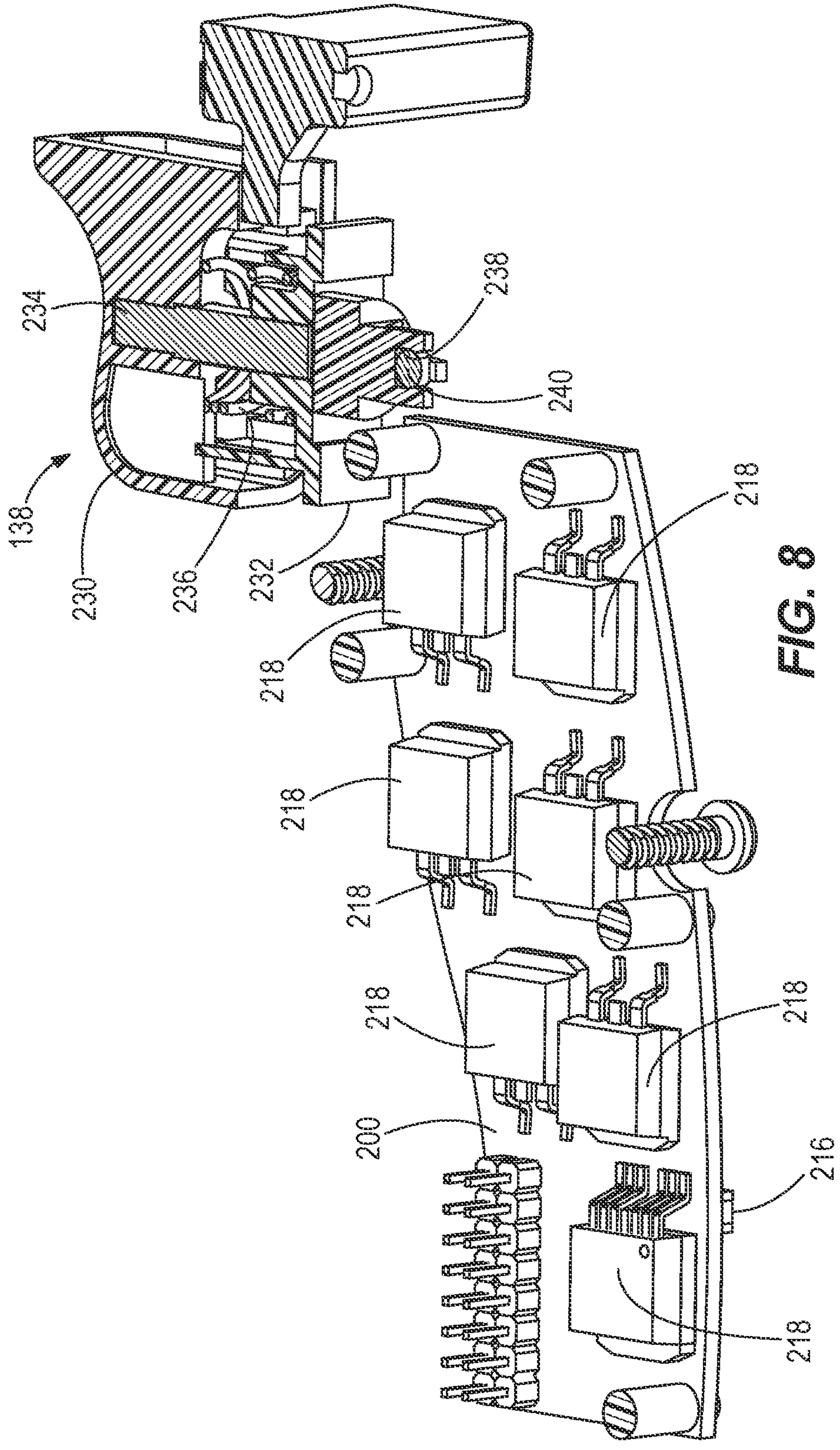
FIG. 8 is a perspective view of the controller of FIG. 6, with portions removed.

The high-level or master controller 58 refers to printed circuit boards (PCBs) within the handle of the power tool and the circuitry thereon. In particular, as shown in FIG. 6, the controller 58 includes a power PCB 200 and a control PCB 202 in a stacked arrangement whereby the mounting surfaces of the first and second PCBs form generally parallel planes. FIG. 7 provides a similar view of the controller 58 as shown in FIG. 6, but with the power PCB 200 removed to expose the control PCB 202. FIG. 8 provides a view of the opposite side of the controller 58, relative to FIG. 6, with the control PCB 202 removed to expose an underside of the power PCB 200.

Figure 9:
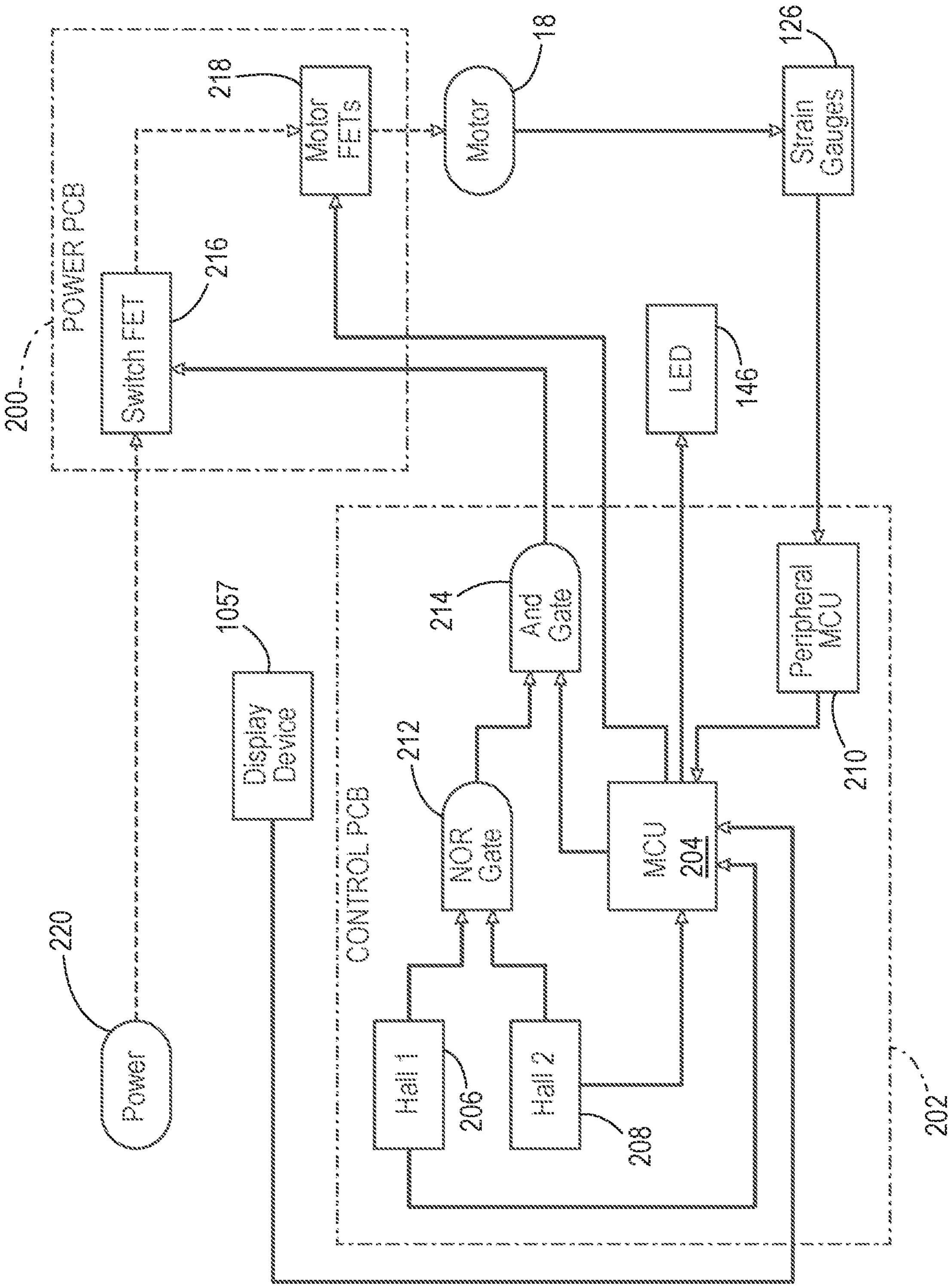
FIG. 9 is a schematic of the electrical components incorporated in the power tool of FIG. 1.

FIG. 9 illustrates a circuit block diagram of components of the master controller 58 including circuitry on the power PCB 200 and control PCB 202. As shown, the control PCB 202 includes a microcontroller (MCU) 204, Hall sensor 206, Hall sensor 208, peripheral MCU 210, NOR gate 212, and an AND gate 214, and the power PCB 200 includes a switch field effect transistor (FET) 216 and motor FETs 218. A power source 220 is a power tool battery pack that provides DC power to the various components of the power tool 10. For instance, the power source 220 may be a rechargeable power tool battery pack having lithium ion cells. In some instances, the power source 122 may receive AC power (e.g., 120V/60 Hz) via a plug that is coupled to a standard wall outlet, and then filter, condition, and rectify the received power to output DC power to tool components. Generally speaking, components of the control PCB 202 detect depression of the trigger 138 by the user and, in response, control components of the power PCB 200 to supply power from the power source 220 to drive the motor 18.

Turning to FIG. 7, the trigger 138 includes a trigger body 230, a holder 232, an arm 234 fixed to the trigger body 230 and extending through the holder 232, and a spring 236. The holder 232 is fixed to the main housing 14 of the tool 10, and the trigger body 230 is able to move relative to the holder 232 along a longitudinal axis 237 of the arm 234. The spring 236 provides a biasing force directing the trigger body 230 away from the holder 232. The arm 234 is fixed to and moves in unison with the trigger body 230. The arm 234 includes a magnet holder 238, which is a cavity or recess that receives and secures a magnet 240.

Figure 10:
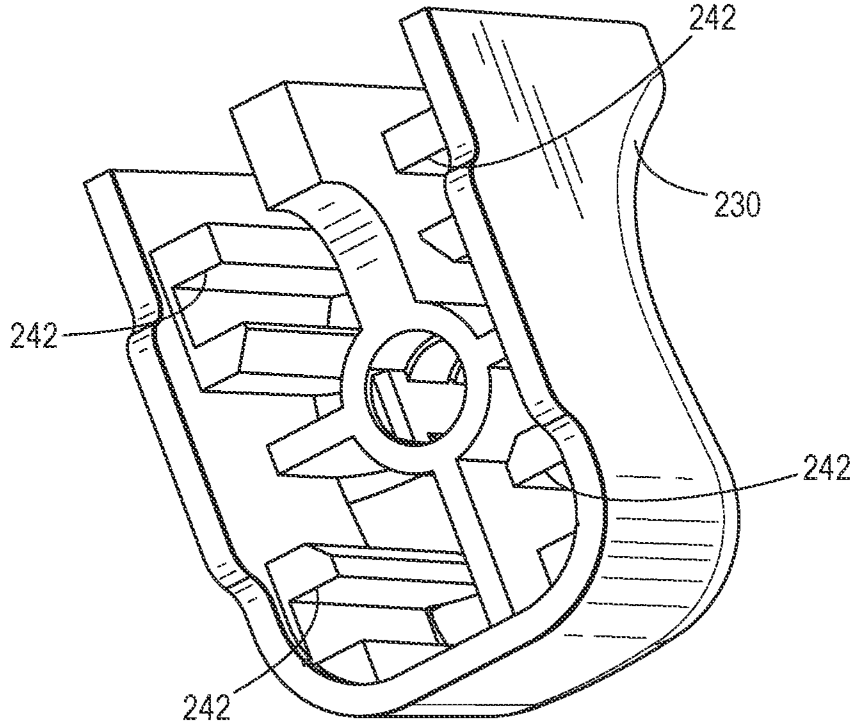
FIG. 10 is a perspective view of a trigger of the power tool of FIG. 1.
Figure 11:
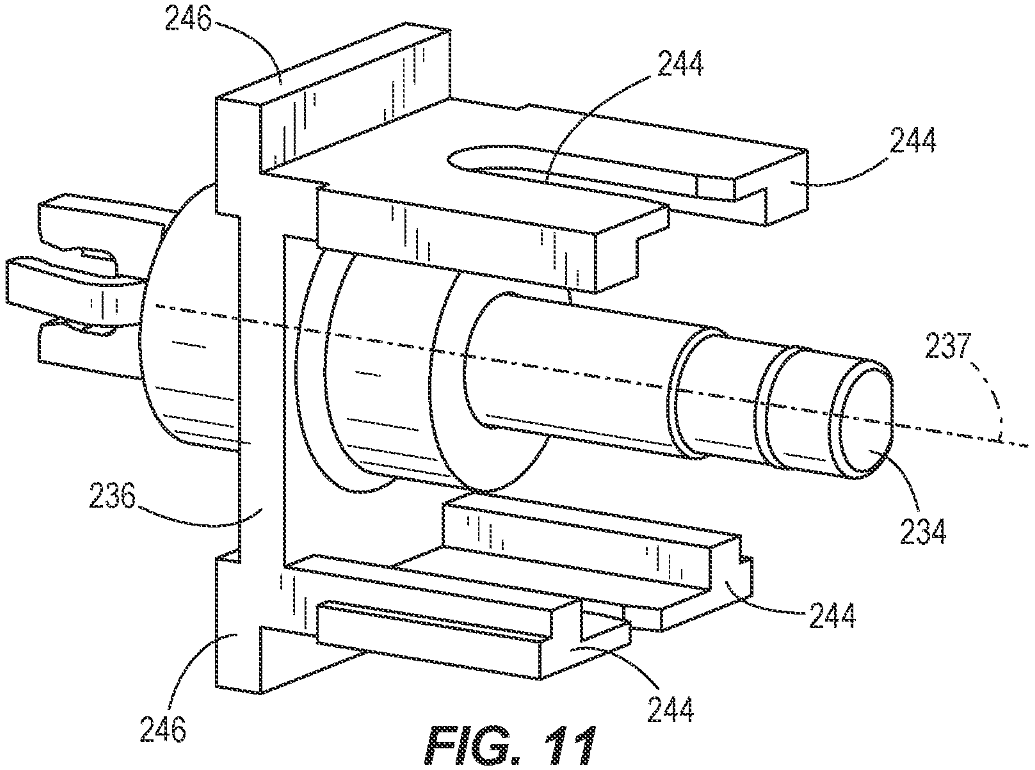
FIG. 11 is a perspective view of a trigger holder of the power tool of FIG. 1.
Figure 12:
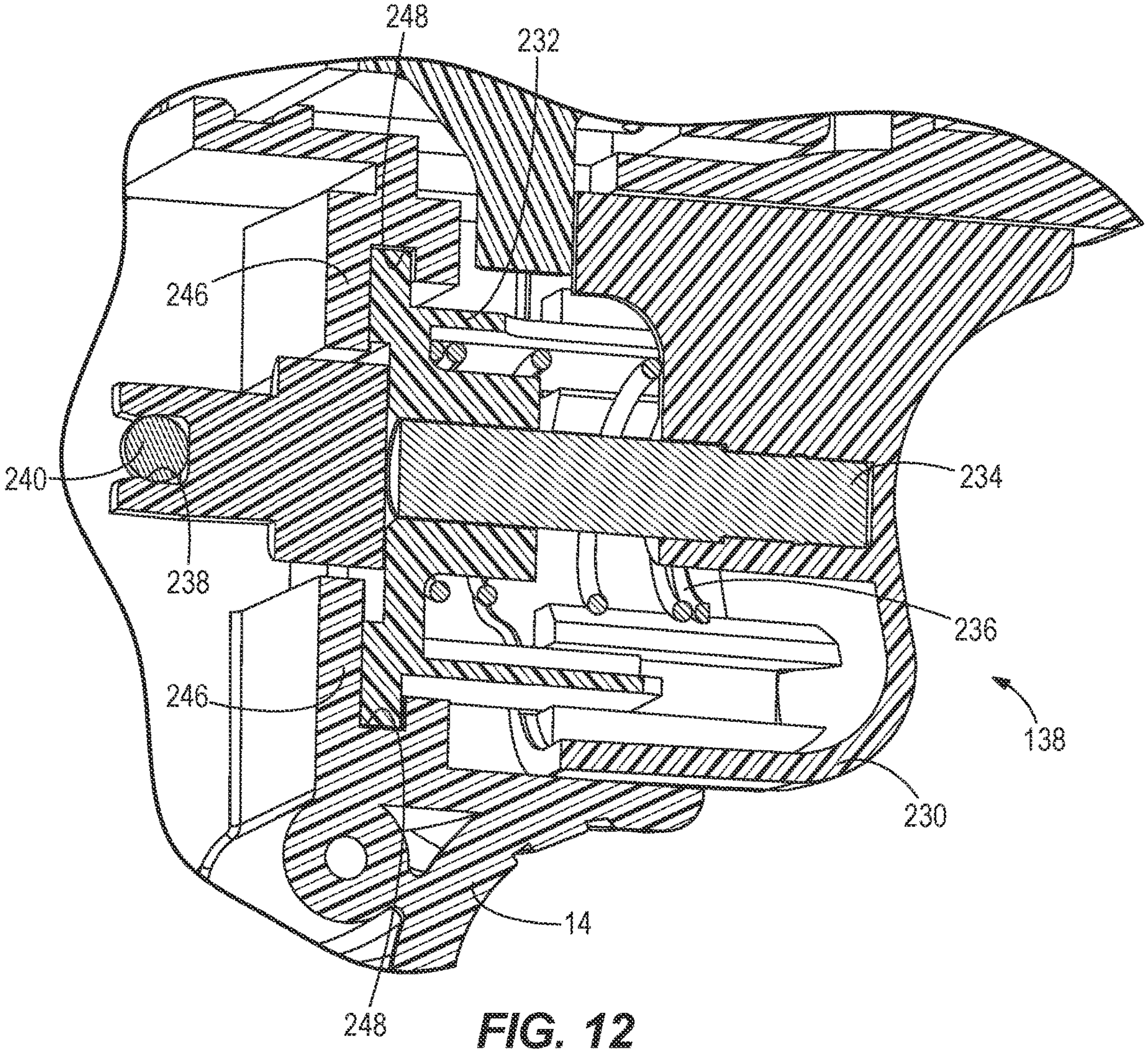
FIG. 12 is a cross-sectional view of the assembled trigger and trigger holder of FIGS. 10 and 11, respectively, within the power tool of FIG. 1.

FIG. 10 illustrate the trigger body 230 separate from the holder 232 and arm 234. The trigger body 230 includes four guide channels 242. FIG. 11 illustrates the holder 232 with the arm 234, separate from the trigger body 230. The holder 232 includes four guides 244, each of which is received by a respective guide channel 242. The guide channels 242 and guides 244 ensure that the trigger body 230 travels along the longitudinal axis 237 of the arm 234. The holder 232 further includes flanges 246 extending in a direction generally perpendicular to the longitudinal axis 237 of the arm. As shown in FIG. 12, the flanges 246 are received by recesses 248 of the main housing 14 of the tool 10. The flanges 246 and recesses 248 cooperate to fix the holder 232 to the main housing 14.

When a user depresses the trigger body 230 inward toward the holder 232, overcoming the biasing force of the spring 236, the magnet 240 passes toward and over the Hall sensors 206 and 208. Each Hall sensor 206 and 208 provides a binary output of logic high or logic low, depending on the location of the magnet 240. More particularly, the Hall sensors 206 and 208 output a logic low signal when the trigger body 230 is depressed inward toward the holder 232 because the magnet 240 passes over the Hall sensors 206 and 208. Conversely, the Hall sensors 206 and 208 output a logic high signal when the trigger body 230 is biased away from the holder 232 (i.e., not depressed by a user) because the magnet 240 is not near the Hall sensors 206 and 208. Accordingly, the Hall sensors 206 and 208 detect and output an indication of whether the trigger body 230 is depressed inward or biased outward (released).

Returning to FIG. 9, the output of the Hall sensor 206 is provided to a first input of the NOR gate 212 and to the MCU 204, and the output of the Hall sensor 208 is provided to a second input of the NOR gate 212 and to the MCU 204. The NOR gate 212 outputs a logic low signal unless both its first and second input receive a logic low signal, in which case, the NOR gate 212 outputs a logic high signal. In other words, the NOR gate 212 outputs a logic high signal to the AND gate 214 when both the first and second inputs of the NOR gate 212 receive a logic low signal. However, when either or both of the inputs of the NOR gate 212 receive a logic high signal, the NOR gate 212 outputs a logic low signal to the AND gate 214. Similarly, the MCU 204 outputs a logic high signal to the AND gate 214 when both the Hall sensors 206 and 208 output a logic low signal. Otherwise, when either or both of the inputs of the MCU 204 receive a logic high signal from the Hall sensors 206 and 208, the NOR gate 212 outputs a logic low signal to the AND gate 214.

The AND gate 214 includes a first input receiving a signal from the NOR gate 212 and a second input receiving a signal from the MCU 204. The AND gate 214 outputs a logic high signal when both the NOR gate 212 and the MCU 204 output logic high signals to respective inputs of the AND gate 214. When either or both of the inputs of the AND gate 214 receive logic low signals, the AND gate 214 outputs a logic low signal.

The AND gate 214 outputs a control signal to the switch FET 216. When the AND gate 214 outputs a logic low signal, the switch FET 216 is open or "off" such that power from the power source 220 does not reach the motor FETs 218. When the AND gate 214 outputs a logic high signal, the switch FET 216 is closed or "on" such that power from the power source 220 reaches the motor FETs 218.

Accordingly, when a user depresses the trigger body 230, the magnet 240 passes over Hall sensors 206 and 208, causing both to output a logic low signal to the NOR gate 212, which causes the NOR gate 212 to output a logic high signal to the AND gate 214 and the AND gate 214 to output a logic high signal to turn on the switch FET 216. Similarly, when a user releases the trigger body 230, biasing spring 236 moves the magnet 240 away from the Hall sensors 206 and 208, causing both Hall sensors 206 and 208 to output a logic high signal to the NOR gate 212, which causes the NOR gate 212 to output a logic low signal to the AND gate 214 and the AND gate 214 to output a logic low signal to turn off or open the switch FET 216. Thus, when the trigger 138 is depressed, the switch FET 216 is turned on, and when the trigger 138 is released, the switch FET 216 is turned of.

Additionally, when the MCU 204 receives logic low signals from both Hall sensors 206 and 208, indicating that the trigger 138 is depressed, the MCU 204 controls the motor FETs 218 to drive the motor 18. Not illustrated in FIG. 9 are additional Hall sensors that output motor feedback information, such as an indication (e.g., a pulse) when a rotor magnet of the motor 18 rotates across the face of the additional Hall sensors. Based on the motor feedback information from these additional Hall sensors, the MCU 204 can determine the position, velocity, and/or acceleration of the rotor. The MCU 204 uses this motor feedback information to control the motor FETs 218 and, thereby, the motor 18. The MCU 204 further receives an indication from a selector Hall sensor (not shown) that provides an indication of the position of the forward reverse selector 244*a*. The Hall sensor associated with the forward reverse selector 244*a* is located on a PCB that is separate from the power PCB 200 and that is vertically oriented in front of the selector 244*a*. The MCU 204 controls the motor FETs 218 to drive the motor in a forward direction or a reverse direction depending on the indication from the selector Hall sensor.

Accordingly, when the trigger 138 is depressed, the MCU 204 detects that the trigger 138 is depressed and the desired rotational direction from based on the position of the forward reverse selector 244*a*, the switch FET 216 is turned on, and the MCU 204 controls the motor FETs 218 to drive the motor 18. Conversely, when the trigger 138 is released, the MCU 204 detects that the trigger 138 is released, the switch FET 216 is turned off, and the MCU 204 ceases switching the motor FETs 218, stopping the motor 18. The trigger 138 may be referred to as a contactless trigger because the movement from depressing and releasing the main body 230 does not physically make and break electrical connections. Rather, Hall sensors 206 and 208 are used to detect (and inform the MCU 204) of the position of the main body 230, without contacting a moving component of the trigger 138.

The Hall sensors 206 and 208 are essentially redundant sensors that are intended to provide the same output, except that the Hall sensor 208 may change state slightly before or after Hall sensor 206 given their alignment on the control PCB 202, where Hall sensor 208 is nearer to the edge. For instance, the Hall sensor 208 may detect the presence of the magnet 240 as the trigger body 230 is depressed slightly before the Hall sensor 206, and may detect the absence of the magnet 240 as the trigger body 230 is released by the user slightly after the Hall sensor 206.

The high-level or master controller 58 in the power tool 10 is capable of monitoring the signals output by the strain gauges 126, comparing the calibrated or measured torque to one or more predetermined values, controlling the motor 18 in response to the torque output of the power tool 10 reaching one or more of the predetermined torque values, and actuating the worklight 142 to vary a lighting pattern of the workpiece and surrounding workspace to signal the user of the tool 10 that a final desired torque value has been applied to a fastener. In the illustrated embodiment of the power tool 10, the peripheral MCU 210 compares the measured torque from the strain gauges 126 to a first torque threshold and a second torque threshold, which is greater than the first torque threshold. The peripheral MCU 210 outputs an indication to the MCU 204 when the measured torque reaches the first torque threshold, and the MCU 204 controls the motor FETs 218 to reduce the rotational speed of the motor 18 to reduce the likelihood of overshoot and excessive torque being applied to the workpiece. Thereafter, the MCU 204 continues to drive the motor 18 at the reduced rotational speed until the peripheral MCU 210 indicates that the measured torque reaches the second (and desired) torque value, at which time the MCU 204 controls the motor FETs 218 to deactivate the motor 18.

Upon initial activation of the tool 10 for a fastener-driving operation, the MCU 204 activates the LED 146 in the worklight 142 to emit a white light to illuminate the workpiece and surrounding workspace in a traditional manner. Thereafter, upon the measured torque reaching the second (and desire) torque value, the MCU 204 actuates the LED 146 to vary the lighting pattern emitted by the LED 146 to signal or indicate to the user that the desired torque value was successfully attained. For example, the MCU 204 may actuate the LED 146 to change color from white to green to indicate that the desired torque value was successfully attained. However, if a problem arises that prevents the desired torque value from being attained, the MCU 204 may actuate the LED 146 to change color from white to red. Alternatively, rather than the LED 146 being actuated to change color, the MCU 204 may vary the lighting pattern of the LED 146 by causing it to flash one or more different patterns to signal to the user that the desired torque value was successfully attained and/or not attained. By using the worklight 142 as an indicator to communicate the performance of the tool 10, users need not take their eyes off of the workpiece during a fastener driving operation to learn whether or not the desired torque value on a fastener has been attained. And, because the worklight 132 is located at the front of the tool 10, users may grasp the tool 10 in different manners to apply sufficient leverage on the workpiece and/or fastener without concern of unintentionally blocking the worklight 142.

Although not shown in the drawings, the tool 10 may also include a secondary display (with a primary display being used to set the torque setting of the tool 10) for indicating the tool's torque setting when a battery is not connected to the tool 10. Such a secondary display may be, for example, a bi-stable display that only requires power when the image on the display is changed. Such a bi-stable display is commercially available from Eink Corporation of Billerica, Massachusetts. However, no power is consumed or otherwise required to maintain a static image on the display. When the torque setting of the tool 10 is changed (i.e., when a battery is connected), the controller 58 may update the image on the secondary display to reflect the new torque setting of the tool 10 after it is changed. By incorporating such a secondary, bi-stable display on the tool 10, large quantities of the tool 10 can be stored in a tool crib, with their batteries removed, while displaying the torque settings of the tools 10 so that a tool crib manager or individuals accessing the tool crib can choose which tool 10 to use without first having to attach a battery to the tool 10. Therefore, a tool 10 that is already set to a particular torque setting, as shown by the secondary bi-stable display, can be selected by an individual without requiring the individual to first attach a battery to the tool 10 to determine its torque setting. Such a bi-stable display may also, or alternatively, be incorporated on the battery of the tool 10 to indicated its state of charge.

Figure 13:
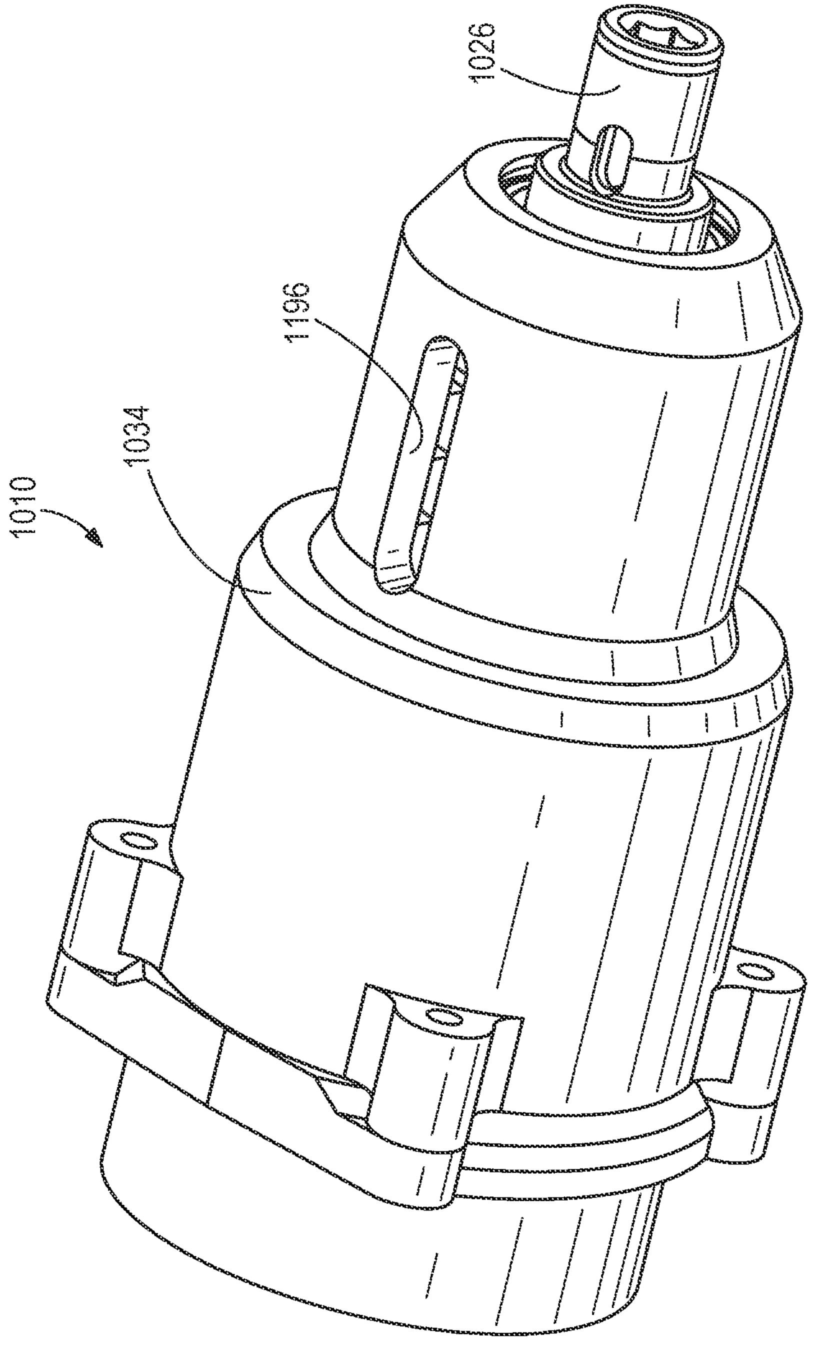
FIG. 13 is a perspective view of a portion of a rotary power tool incorporating a clutch mechanism in accordance with another embodiment of the invention.

FIG. 13 illustrates a portion of a power tool 1010 in accordance with another embodiment of the invention. The power tool 1010 includes a clutch mechanism 1154, but is otherwise similar to the power tool 10 described above with reference to FIGS. 1-12, with like components being shown with like reference numerals plus 1000. Only the differences between the power tools 10, 1010 are described below.

Figure 14:
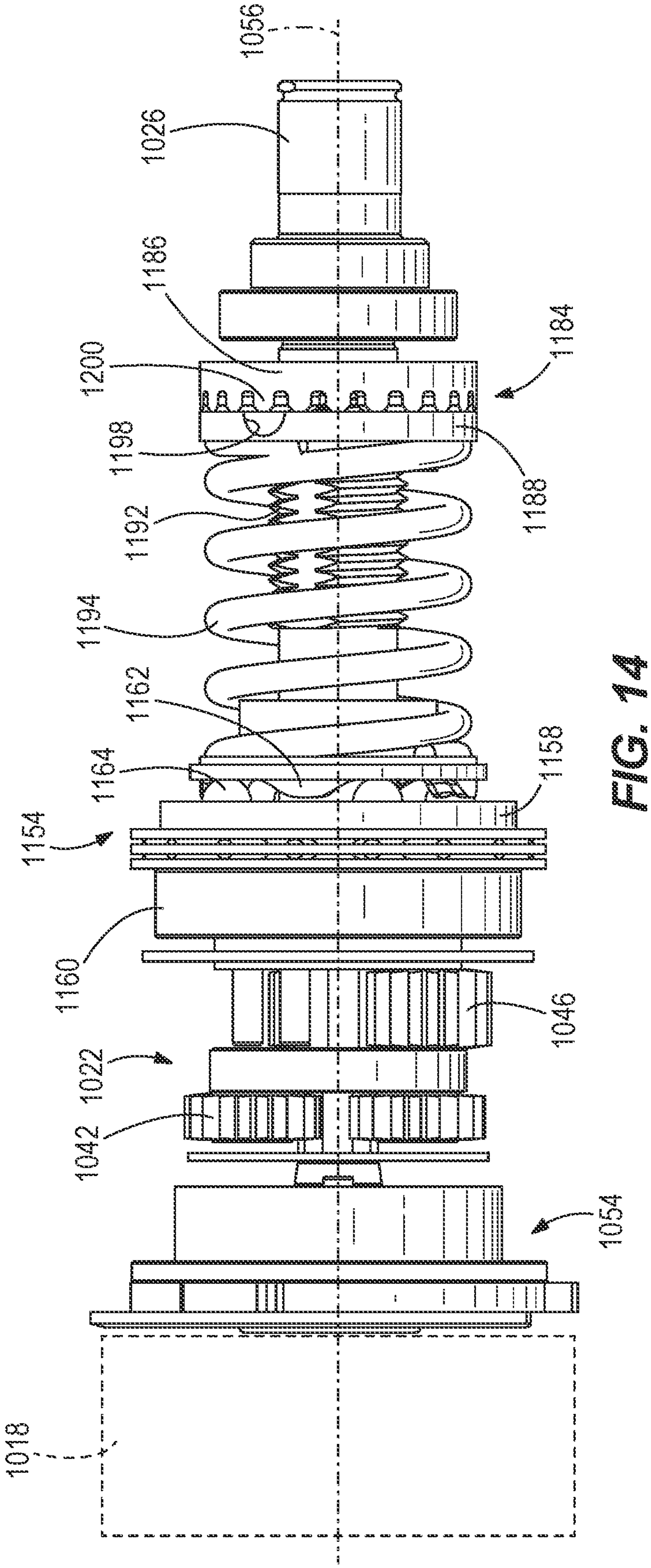
FIG. 14 is a side view of the rotary power tool of FIG. 13, illustrating the clutch mechanism.
Figure 15:
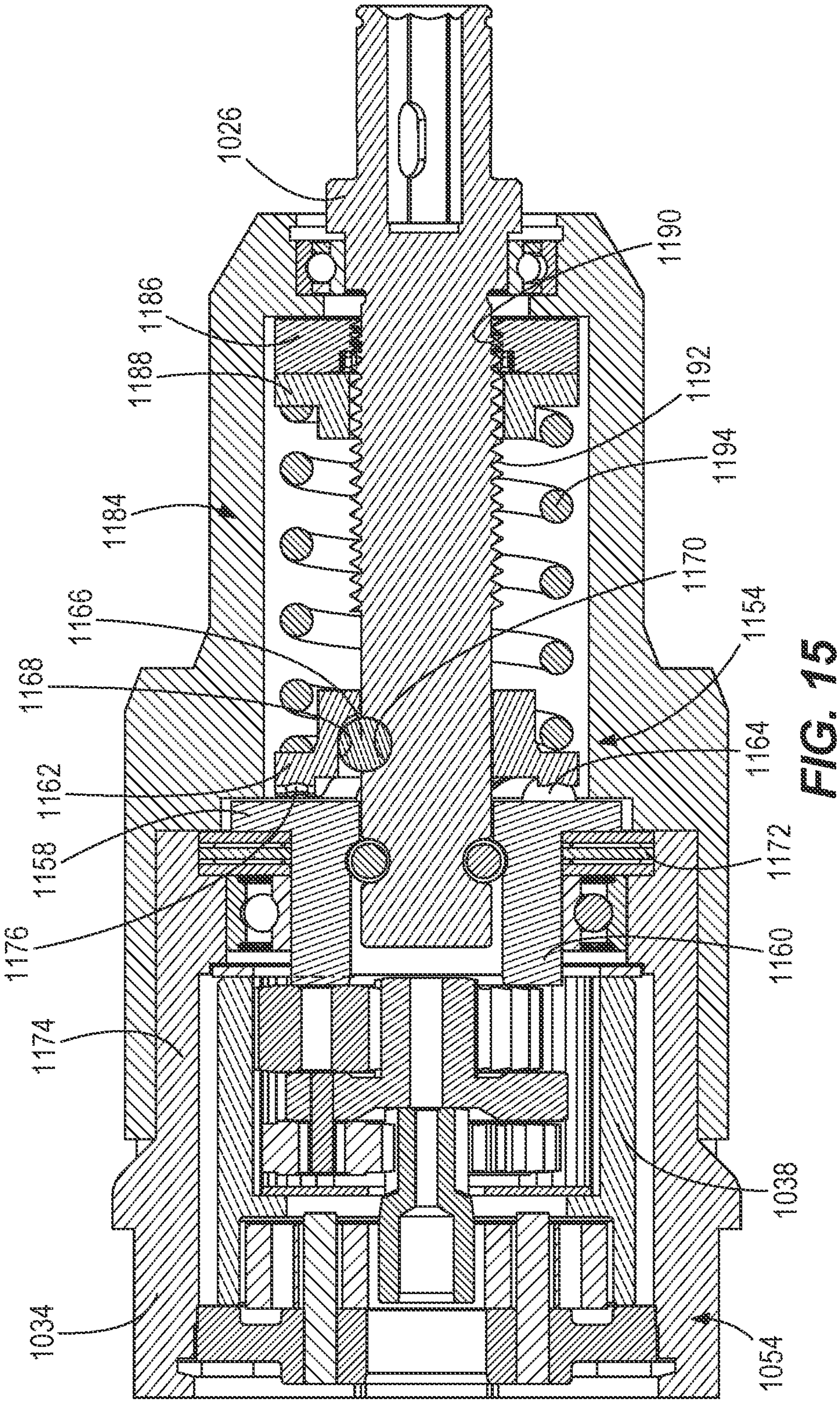
FIG. 15 is a longitudinal cross-sectional view the rotary power tool of FIG. 14.

With reference to FIGS. 13 and 14, the power tool 1010 includes a motor 1018, a transmission housing 1034, a multi-stage planetary transmission 1022 within the transmission housing 1034 that receives torque from the motor 1018, and an output spindle 1026 coupled for co-rotation with the output of the transmission 1022. With reference to FIG. 15, the transmission 1022 includes a common ring gear 1038 (FIG. 15) positioned within the transmission housing 1034 for transmitting torque through consecutive planetary stages 1042, 1046.

With reference to FIGS. 14 and 15, the tool 1010 also includes a transducer assembly 1054, which is identical to the transducer assembly 54 described above, positioned inline and coaxial with a rotational axis 1056 of the motor 1018, the transmission 1022, and the output spindle 1026. The transducer assembly 1054 detects the torque output by the spindle 1026 and interfaces with a display device 1057 (FIG. 9) (i.e., through a high-level or master controller 58, shown in FIG. 2) to display the numerical torque value output by the spindle 1026 for each fastener-driving operation. Such a display device 1057, for example, may be situated on board and incorporated with the tool 1010 (e.g., an LCD screen), or may be remotely positioned from the tool 1010 (e.g., a mobile electronic device). In an embodiment of the tool 1010 configured to interface with a remote display device, the tool 1010 would include a transmitter (e.g., using Bluetooth or WiFi transmission protocols, for example) for wirelessly communicating the torque value achieved by the output spindle 1026 for each fastener-driving operation to the remote display device. In contrast with the power tool 10, the transducer assembly 1054 of the tool 1010 does not interface with the motor 1018 to control the rotational speed of the motor 1018 as the torque output approaches a pre-defined torque value or torque threshold. Instead, a mechanical clutch mechanism 1154 (FIGS. 14 and 15) inhibits torque output to the workpiece from exceeding the torque threshold.

Referring to FIG. 15, the clutch mechanism 1154 is operable to selectively divert torque output by the motor 1018 away from the output spindle 1026 when a reaction torque on the output spindle 1026, which is imparted by the fastener or workpiece being driven by the tool 1010, reaches the predetermined torque threshold of the clutch mechanism 1154. The clutch mechanism 1154 includes a first plate 1158 (see also FIG. 17) coupled for co-rotation with an output carrier 1160 of the second planetary stage 1046 of the transmission 1022, a second plate 1162 (see also FIG. 16) coupled for co-rotation with the output spindle 1026, and a plurality of engagement members (e.g., balls 1164) positioned between the first and second plates 1158, 1162 through which torque is transferred from the transmission 1022 to the output spindle 1026 when the clutch mechanism 1154 is engaged. In the illustrated embodiment of the tool 1010, the first plate 1158 is integrally formed as a single piece with the output carrier of the second planetary stage 1046, whereas the second plate 1162 is slidably coupled and rotationally constrained to the output spindle 1026 via a set of balls 1166 (only one of which is shown in FIG. 15) received in corresponding blind grooves 1168 formed in the second plate 1162 and corresponding dimples 1170 formed in the outer periphery of the spindle 1026. Accordingly, the second plate 1162 is capable of sliding axially along the rotational axis 1056 while simultaneously co-rotating with the spindle 1026. Alternatively, the first plate 1158 may be formed separately from the output carrier 1160 of the planetary stage 1046 and secured thereto in any of a number of different ways (e.g., using an interference or press-fit, fasteners, by welding, etc.). Furthermore, the second plate 1166 may alternatively be slidably coupled to the spindle 1026 using another arrangement, such as a spline-fit, which would permit the second plate 1162 to slide axially relative to the spindle 1026 yet rotationally constrain the second plate 1162 to the spindle 1026.

With reference to FIGS. 14 and 15, the clutch mechanism 1154 also includes a thrust bearing 1172 interposed between an inwardly-extending annular wall 1174 of the transmission housing 1034 and the first plate 1158 to facilitate rotation of the first plate 1158 relative to the housing 1034.

Figure 16:
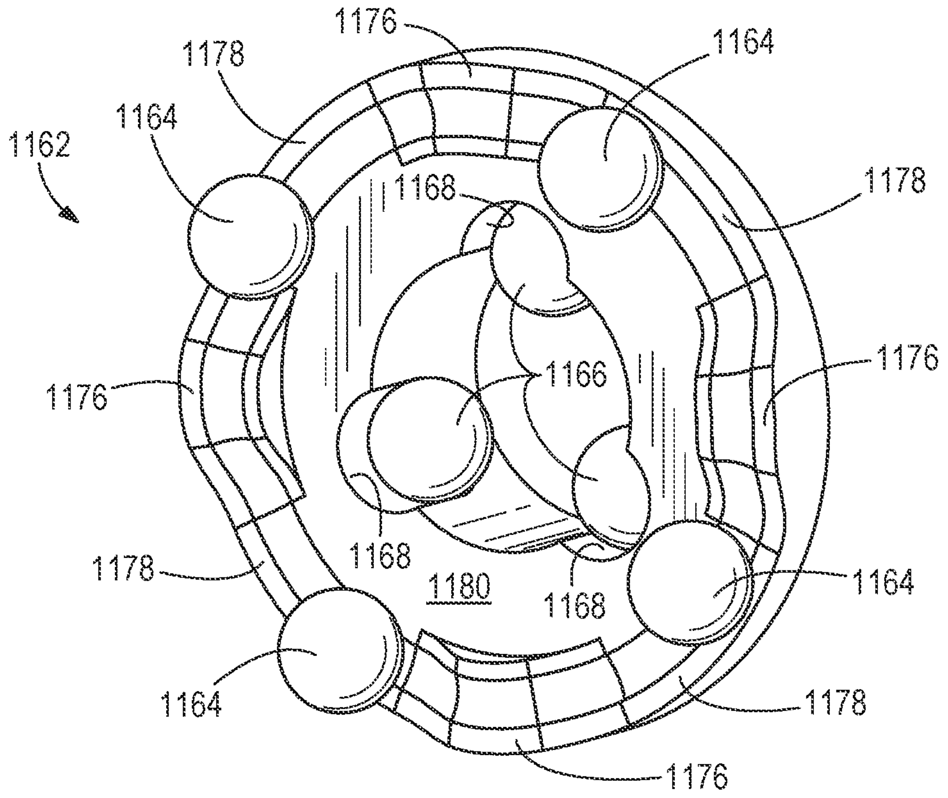
FIG. 16 is a rear perspective view of a second plate of the clutch mechanism of FIG. 14.
Figure 17:
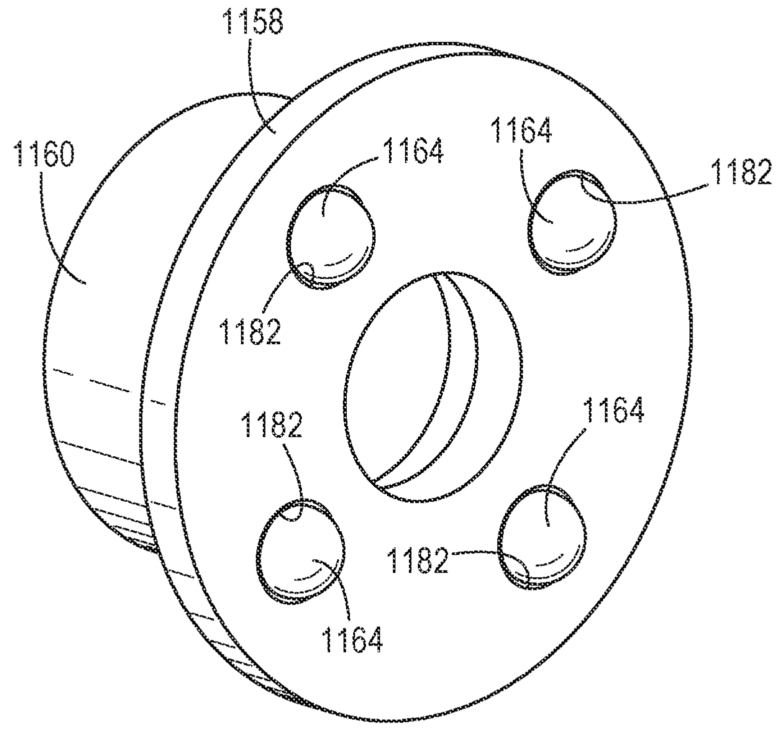
FIG. 17 is a front perspective view of a first plate of the clutch mechanism of FIG. 14.

With reference to FIGS. 16 and 17, the second plate 1162 includes axially extending protrusions 1176 spaced about the rotational axis 1056. Grooves 1178 are defined in an end face 1180 of the second plate 1162 by adjacent protrusions 1176 in which the balls 1164 are respectively received. As shown in FIG. 17, the first plate 1158 includes dimples 1182 radially spaced from the rotational axis 1056 in which the balls 1164 are at least partially positioned, with the remainder of the balls 1164 being received within the respective grooves 1178 in the end face 1180 of the second plate 1162 (FIG. 16).

With reference to FIGS. 14 and 15, the tool 1010 also includes a clutch mechanism adjustment assembly 1184 operable to set the torque threshold at which the clutch mechanism 1154 slips (i.e., when the balls 1164 slide from one groove 1178 to an adjacent groove 1178 by traversing the protrusions 1176). The clutch mechanism adjustment assembly 1184 includes an adjustment ring or nut 1186 threaded to the output spindle 1026 and an annular spring seat 1188 adjacent the nut 1186 through which the spindle 1026 extends. Particularly, the nut 1186 includes a threaded inner periphery 1190, and the spindle 1026 includes a corresponding threaded outer periphery 1192. Accordingly, relative rotation between the nut 1186 and the spindle 1026 also results in translation of the nut 1186 along the spindle 1026 to adjust the preload of a resilient member (e.g., a compression spring 1194). The spring 1194 is positioned circumferentially around the spindle 1026 and between the second plate 1162 and the seat 1188, and is operable to bias the second plate 1162 toward the first plate 1158. As shown in FIG. 13, an elongated aperture 1196 formed in the transmission housing 1034 permits access to the clutch mechanism adjustment assembly 1184 by a hand tool (not shown), which is operable to rotate the nut 1186 relative to the spindle 1026. Such a hand tool may include a head insertable within a radial slot 1198 formed in the seat 1188 (FIG. 14) and engageable with gear teeth 1200 formed on the nut 1186. Accordingly, rotation of the hand tool would impart rotation to the nut 1186 (relative to the spindle 1026), changing the compressed length and therefore the preload of the spring 1194. Such a hand tool may resemble, for example, a drill chuck key.

During operation, the tool 1010 can mechanically limit the amount of torque transferred to the fastener or workpiece via the clutch mechanism 1154 while simultaneously providing visual feedback (i.e., through the display device 1057) of the amount of torque exerted on the fastener or workpiece via the transducer assembly 1054. When incorporated into a single device, such as the tool 1010, these features (i.e., the visual feedback of torque output and the mechanical torque-limiting clutch mechanism 1154) allow the operator to calibrate the torque threshold of the tool 1010 using a trial and error procedure, without using external or additional machines and/or devices which would otherwise be required for calibrating the tool 1010. Also, when these features are used in tandem, the operator of the tool 1010 is provided with immediate visual feedback of the torque value that is exerted on the fastener or workpiece when the clutch mechanism 1154 slips. Subsequently, the operator can advantageously adjust the preload on the spring 1194 in order to achieve the desired torque threshold.

Figure 18:
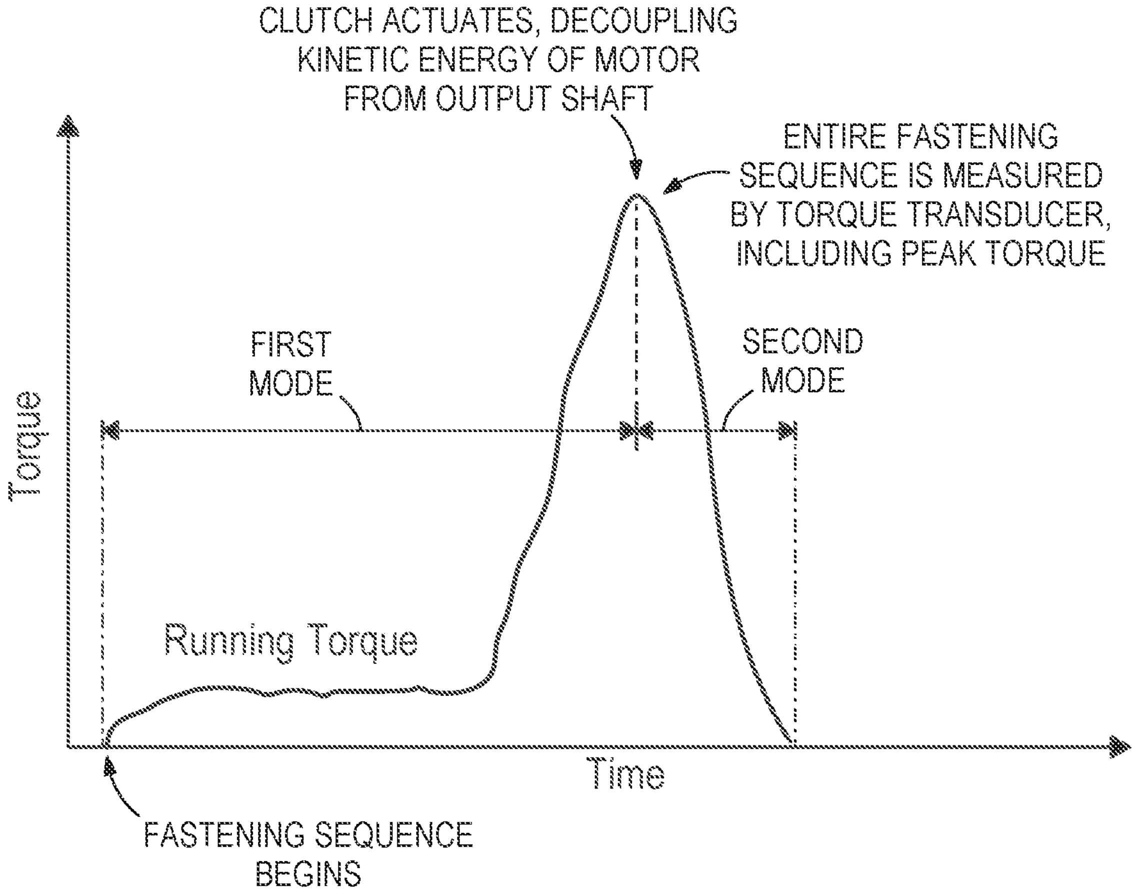
FIG. 18 is a graph of torque versus time during an example fastening sequence using the rotary power tool of FIG. 13.

With reference to FIG. 18, the fastening sequence begins once the motor 1018 is activated (e.g., by depressing the trigger 138), at which point the reaction torque or the "running torque" exerted on the spindle 1026 is measured by the transducer assembly 1054 when the tool bit is engaged with and driving the fastener or workpiece. During the fastening sequence, torque is transferred from the motor 1018, through the planetary transmission 1022, through the clutch mechanism 1154, and to the output spindle 1026 for rotating the tool bit attached to the output spindle 1026. The reaction torque is applied to the output spindle 1026 by the fastener or workpiece being driven in an opposite direction as the output spindle 1026 is rotating. This reaction torque is transmitted through and applied to the transducer assembly 1054 by force component $F_R$ (FIG. 5), which is interpreted by the controller 58 as the running torque.

Throughout the fastening sequence, the clutch mechanism 1154 is operable in a first mode, in which torque from the motor 1018 is transferred through the clutch mechanism 1154 to the output spindle 1026 to continue driving the workpiece, and a second mode, in which torque from the motor 1018 is diverted from the spindle 1026 toward the first plate 1158. Specifically, in the first mode, the first plate 1158 and the second plate 1162 co-rotate, causing the spindle 1026 to rotate at least an incremental amount provided that the reaction torque on the spindle 1026 is less than the torque threshold of the clutch mechanism 1154. As the fastener or workpiece is driven further, the reaction torque on the spindle 1026 increases (illustrated as the positive slope in the graph of FIG. 18). While the reaction torque is less than the torque threshold, the spring 1194 biases the protrusions 1176 of the second plate 1162 toward the balls 1164 of the first plate 1158, causing the balls 1164 to jam against the protrusions 1176 on the second plate 1162 and remain within the grooves 1178 of the second plate 1162 (FIG. 14). As a result, the first plate 1158 is prevented from rotating relative to the second plate 1162 and the output spindle 1026.

When the reaction torque on the output spindle 1026 reaches the torque threshold (illustrated by the maximum torque coinciding with the apex of the trace illustrated in FIG. 18) of the clutch mechanism 1154, the clutch mechanism 1154 transitions from the first mode to the second mode. Specifically, in the second mode, the frictional force exerted on the second plate 1162 by the balls 1164 (which are jammed against the protrusions 1176) is no longer sufficient to prevent the first plate 1158 from rotating or slipping relative to the second plate 1162. As the first plate 1158 initially begins to slip relative to the second plate 1162, the balls 1164 roll up and over (i.e., traverse) the respective protrusions 1176, imparting an axial displacement to the second plate 1162 against the bias of the spring 1194, ceasing torque transfer to the second plate 1162 and the spindle 1026. In the event the motor 1018 is activated and the torque threshold is continually exceeded, the first plate 1158 continues to rotate relative to the second plate 1162 and the output spindle 1026. As a result, the reaction torque detected by the transducer assembly 1054 rapidly decreases (illustrated by the negative slope in the graph of FIG. 18) from the torque value at which the clutch mechanism 1154 initially slipped or transitioned from the first mode to the second mode. The first plate 1158 will continue to slip or rotate relative to the second plate 1162 and the output spindle 1026, causing the balls 1164 to ride up and over the protrusions 1176, so long as the reaction torque on the output spindle 1026 exceeds the torque threshold of the clutch mechanism 1154.

As described above, during the entire sequence of a fastener driving operation (i.e., beginning with the clutch mechanism 1154 operating in the first mode and concluding with the clutch mechanism 1154 operating in the second mode), the controller 58 calibrates the voltage signal from the transducer 1054 to a measure of reaction torque transferred through the clutch mechanism 1154. Coinciding with the transition of the clutch mechanism 1154 from the first mode to the second mode, the controller 58 calculates the peak actual torque value output by the spindle 1026 (which coincides with the apex of the trace illustrated in FIG. 18), and prompts the display device 1057 to display the actual torque value output by the spindle 1026.

Should the operator of the tool 1010 decide to adjust the tool 1010 to a higher or lower torque threshold to achieve a different actual torque value output by the spindle 1026, based upon the visual feedback of the actual torque value achieved on the display device 1057, the operator increases or decreases the preload on the spring 1194, respectively. To do so, the tool is positioned in the elongated aperture 1196 of the transmission housing 1034 where the tool can engage and rotate the nut 1186. When the nut 1186 is rotated about the spindle 1026, the nut 1186 translates axially along the rotational axis 1056, which either compresses or decompresses the spring 1194 depending on the direction of rotation of the nut 1186. The operator may continue to manually calibrate the tool 1010 in this manner by performing consecutive fastener-driving operations and making incremental adjustments to the clutch mechanism adjustment assembly 1184 to change the output torque of the tool 1010.

Figure 19:
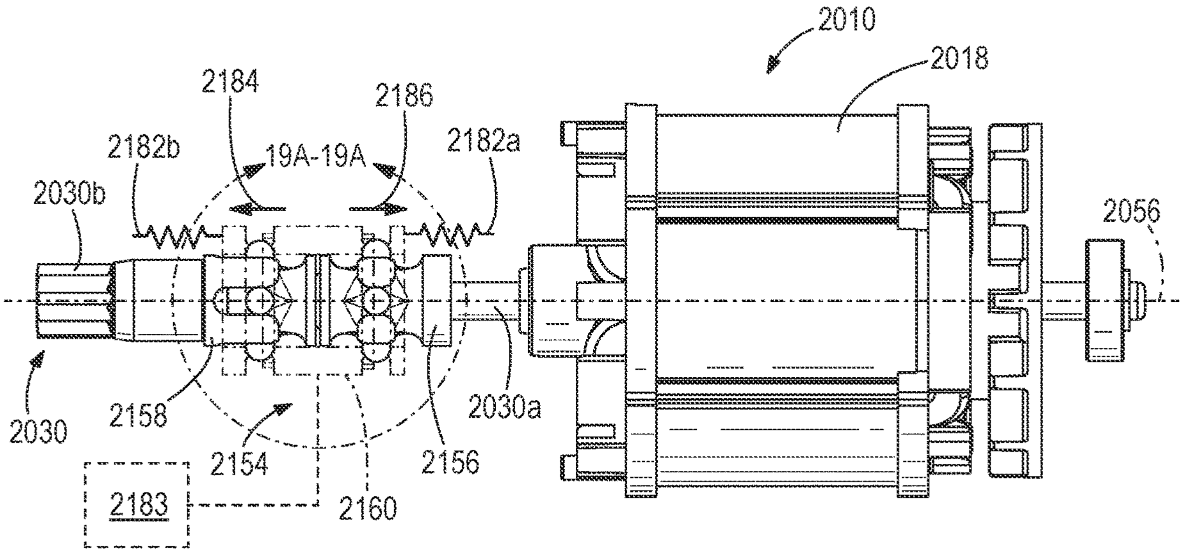
FIG. 19 is a side view of a portion of a rotary power tool incorporating a clutch mechanism in accordance with another embodiment of the invention.

FIG. 19 illustrates a portion of a power tool 2010 in accordance with another embodiment of the invention. The power tool 2010 includes a clutch mechanism 2154, but is otherwise similar to the power tool 1010 described above with reference to FIGS. 1-12, with like components being shown with like reference numerals plus 2000. Only the differences between the power tools 10, 2010 are described below.

Figure 20:
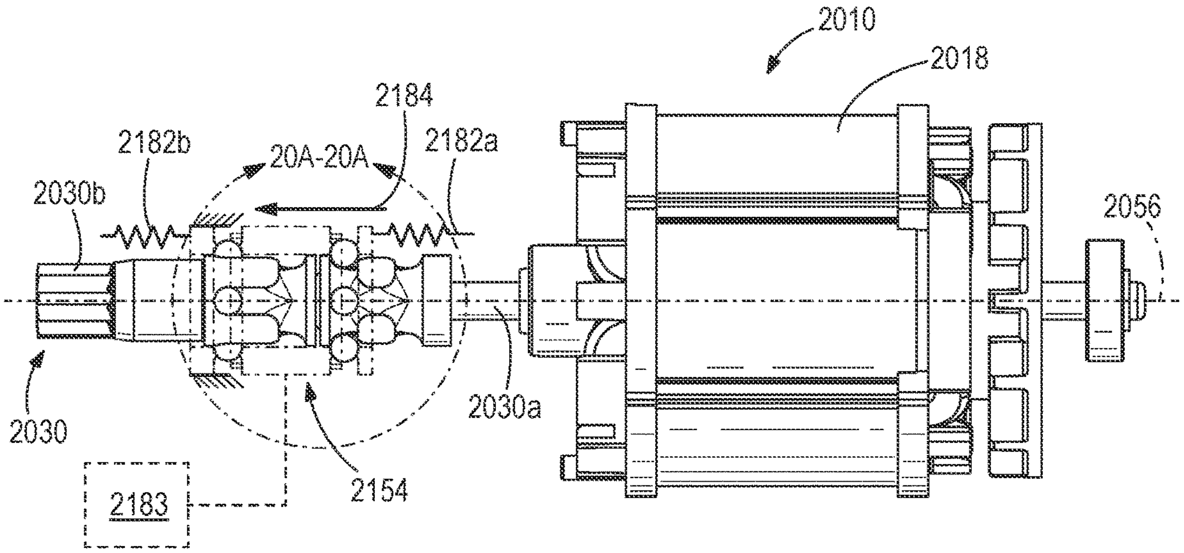
FIG. 20 is a side view of the clutch mechanism in a torque wrench mode.
Figure 21:
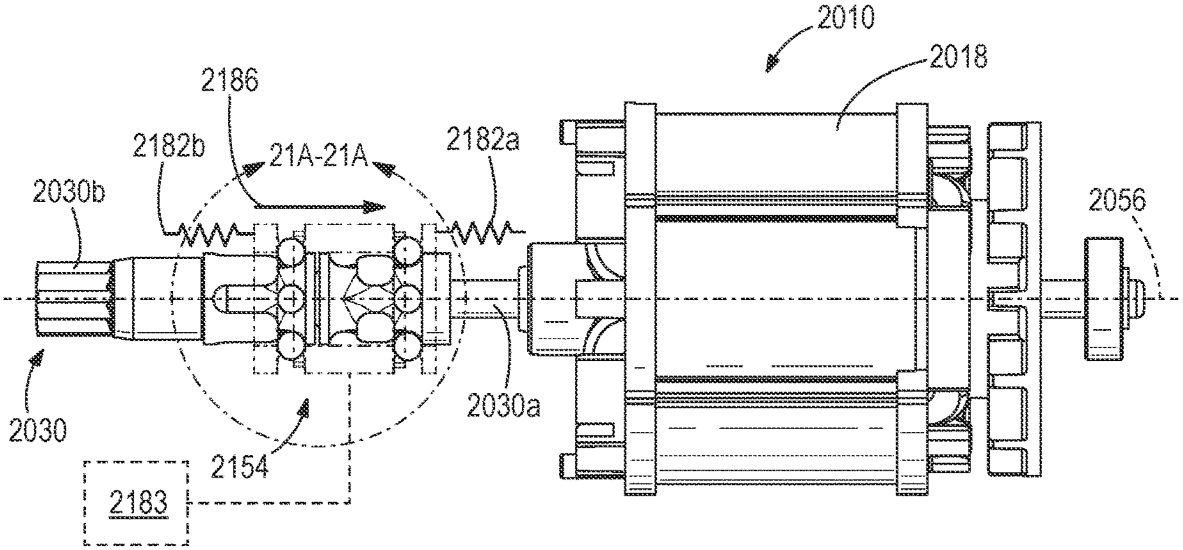
FIG. 21 is a side view of the clutch mechanism in a disengaged mode.

With reference to FIGS. 19, 20, and 21, the power tool 2010 includes a brushless electric motor 2018 having a drive shaft 2030 for providing a rotational input to a multi-stage planetary transmission (e.g., transmission 22; FIG. 2). As shown in FIG. 19, the drive shaft 2030 is formed as two pieces—a first shaft portion 2030*a* extending from an armature of the motor 2018 and a second shaft portion 2030*b* meshed with the transmission. As explained in detail below, the first and second shaft portions 2030*a*, 2030*b* selectively co-rotate such that, in one manner of operation, the first shaft portion 2030*a* transmits torque to the second shaft portion 2030*b*, and in another manner of operation, the first shaft portion 2030*a* rotates independently of the second shaft portion 2030*b* to thereby divert torque from the second shaft portion 2030*b* and the transmission.

The tool 2010 also includes a transducer assembly (not shown, but identical to the transducer assembly 54 described above) positioned inline and coaxial with a rotational axis 2056 of the motor 2018, and between the transmission and the motor 2018. The transducer assembly 54 detects the torque output by the spindle of the tool 2010 (not shown, but identical to the spindle 26 described above) and interfaces with a display device 1057 (i.e., through a high-level or master controller 58, shown in FIG. 2) to display the numerical torque value output by the spindle 26 for each fastener-driving operation. Such a display device, for example, may be situated on board and incorporated with the tool 2010 (e.g., an LCD screen), or may be remotely positioned from the tool 2010 (e.g., a mobile electronic device). In an embodiment of the tool 2010 configured to interface with a remote display device, the tool 2010 would include a transmitter (e.g., using Bluetooth or WiFi transmission protocols, for example) for wirelessly communicating the torque value achieved by the output spindle 26 for each fastener-driving operation to the remote display device. In contrast with the power tool 10, the transducer assembly of the tool 2010 does not interface with the motor 2018 to control the rotational speed of the motor 2018 as the torque output approaches a pre-defined torque value or torque threshold. Instead, the mechanical clutch mechanism 2154 inhibits torque output to the workpiece from exceeding the torque threshold.

Referring to FIG. 19, the clutch mechanism 2154 is interposed between the first shaft portion 2030*a* and the second shaft portion 2030*b* and is electronically controlled by a master controller (e.g., master controller 58 described above) using input from the transducer assembly 54. The clutch mechanism 2154 is shiftable between an engaged mode (FIGS. 19 and 19A), in which the clutch mechanism 2154 interconnects the first and second shaft portions 2030*a*, 2030*b* to permit torque transfer therebetween, and a disengaged mode (FIGS. 21 and 21A), in which the clutch mechanism 2154 rotationally disconnects the shaft portions 2030*a*, 2030*b* to inhibit torque transfer therebetween. As such, the clutch mechanism 2154 is capable of selectively diverting torque away from the output spindle 26 when the reaction torque on the spindle 26 detected by the torque transducer exceeds the predetermined torque threshold.

Figure 19A:
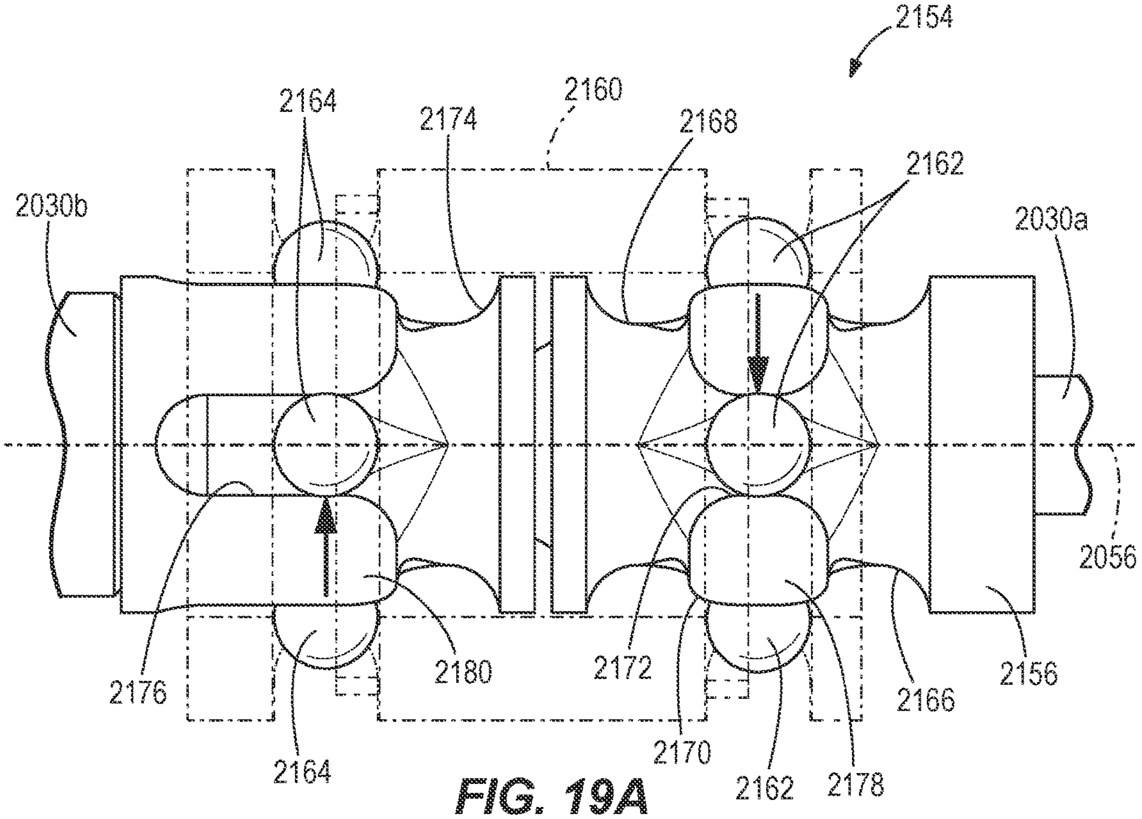
FIG. 19A is an enlarged side view of the clutch mechanism of FIG. 19 in an engaged mode.

With reference to FIG. 19A, the clutch mechanism 2154 includes a first coupling 2156 coupled for co-rotation with the first shaft portion 2030*a* and a second coupling 2158 coupled for co-rotation with the second shaft portion 2030*b*. The clutch mechanism 2154 further includes a sleeve 2160 circumferentially disposed around at least a portion of each of the first and second couplings 2156, 2158, and a plurality of engagement members (e.g., a first set of balls 2162 and a second set of balls 2164) secured to an inner periphery of the sleeve 2160 through which torque is transferred from the first coupling 2156 to the second coupling 2158 when the clutch mechanism 2154 is in the engaged mode. In the illustrated embodiment of the tool 2010, the first and second couplings 2156, 2158 are generally cylindrical in shape and formed as separate components to those of the first and second shaft portions 2030*a*, 2030*b*. The couplings may be secured for co-rotation with the shaft portions 2030*a*, 2030*b* in any number of different ways (e.g., using an interference or press-fit, fasteners, complementary cross-sectional shapes, by welding, etc.). Alternatively, the first and second couplings may be integrally formed as a single piece with the first and second shaft portions 2030*a*, 2030*b*, respectively.

Figure 20A:
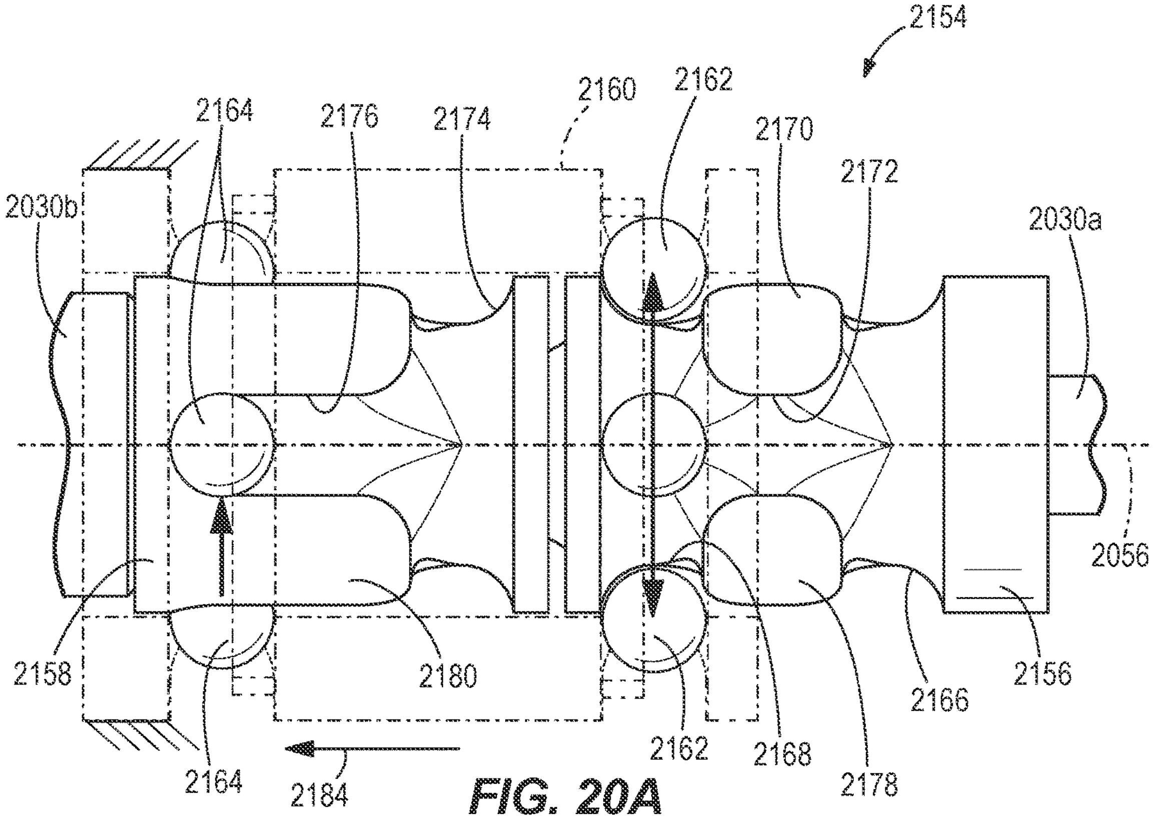
FIG. 20A is an enlarged side view of the clutch mechanism of FIG. 20 in the torque wrench mode.
Figure 21A:
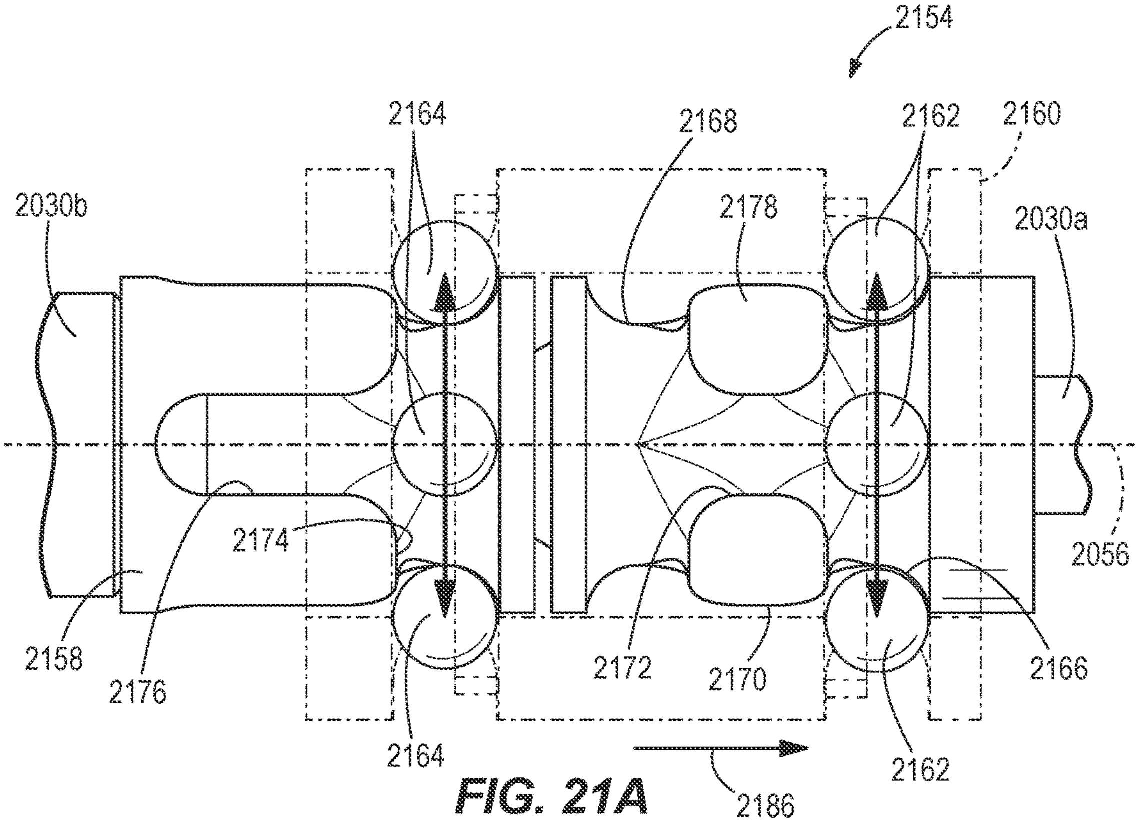
FIG. 21A is an enlarged side view of the clutch mechanism of FIG. 21 in the disengaged mode.

With continued reference to FIG. 19A, the first coupling 2156 includes a first groove 2166 and a second groove 2168, both of which are circumferentially disposed on the outer periphery of the first coupling 2156. Each of the circumferential grooves 2166, 2168 has a semi-spherical profile complementary to the shape of the first set of balls 2162 to accommodate sliding or rolling movement of the first set of balls 2162 relative to the first coupling 2156 alternately within the circumferential grooves 2166, 2168 when the clutch mechanism 2154 is either in the disengaged mode (as shown in FIGS. 21 and 21A) or a torque wrench mode (as shown in FIGS. 20 and 20A), which is described in further detail below. The first circumferential groove 2166 is adjacent the first shaft portion 2030*a*, and the second circumferential groove 2168 is disposed on the first coupling 2156 distally from the first circumferential groove 2166. Accordingly, the first and second circumferential grooves 2166, 2168 are axially spaced from each other along the direction of the rotational axis 2056.

The first coupling 2156 further includes a cylindrical wall 2170 extending between the first and second circumferential grooves 2166, 2168. The cylindrical wall 2170 includes a set of longitudinally extending recesses 2172 that interconnect the circumferential grooves 2166, 2168 and that accommodate the respective balls 2162 when the clutch mechanism 2154 is in the engaged mode (as shown in FIGS. 19 and 19A). In other words, the recesses 2172 are angularly offset from each other along the circumference of the cylindrical wall 2170, and each recess 2172 extends in an axial direction parallel to the rotational axis 2056 such that each recess 2172 extends in a direction perpendicular to and between the first and second circumferential grooves 2166, 2168. The recesses 2172 also have a semi-spherical profile complementary to the shape of the first set of balls 2162.

With continued reference to FIG. 19A, the second coupling 2158 includes a single groove 2174 circumferentially disposed on the outer periphery of the second coupling 2158 located at an end of the second coupling 2158 opposite the second shaft portion 2030*b*. The circumferential groove 2174 has a semi-spherical profile complementary to the shape of the second set of balls 2164 to accommodate sliding or rolling movement of the second set of balls 2164 relative to the second coupling 2158 when the clutch mechanism 2154 is in the disengaged mode (as shown in FIGS. 21 and 21A).

The second coupling 2158 also includes a set of slots 2176 angularly offset from each other along the circumference of the second coupling 2158 and extending in an axial direction parallel to the rotational axis 2056. The slots 2176 also have a semi-spherical profile complementary to the shape of the second set of balls 2164 to accommodate the balls 2164 therein. As shown in FIG. 19A, the rear of each of the slots 2176 opens to the circumferential groove 2174 in the second coupling 2158 and the forward end of each of the slots 2176 terminates before reaching the second shaft portion 2030*b*.

The recesses 2172 in the cylindrical wall 2170 of the first coupling 2156 divide the cylindrical wall 2170 into multiple wall segments or drive lugs 2178. Accordingly, when the first set of balls 2162 are received in the respective recesses 2172, the drive lugs 2178 engage the respective balls 2162 in substantially point contact. Likewise, the slots 2176 in the second coupling 2158 divide the second coupling 2158 into multiple wall segments or driven lugs 2180. Accordingly, when the second set of balls 2164 are received in the respective slots 2176, the driven lugs 2180 engage the respective ball 2164 in substantially point contact.

With reference to FIG. 19, the clutch mechanism 2154 further includes a pair of springs 2182*a*, 2182*b* for biasing the sleeve 2160 towards a default or home position in which the clutch mechanism 2154 is in the engaged mode. The tool 2010 includes an actuator 2183 controlled electronically by the master controller 58 in response to input from the torque transducer 54 for shifting the sleeve 2160 away from the home position shown in FIGS. 19 and 19A, against the bias of the springs 2182*a*, 2182*b*, for shifting the clutch mechanism 2154 between the engaged and disengaged modes. For example, the actuator 2183 may be configured as one or more electromagnets capable of generating a magnetic field for attracting one end (or either end) of the sleeve 2160 to shift the sleeve 2160 away from the home position, or one or more solenoids capable shifting the sleeve 2160 in either direction away from the home position. In the illustrated embodiment of the clutch mechanism 2154, the springs 2182*a*, 2182*b* are disposed on opposing ends of the sleeve 2160, such that the spring 2182*a* biases the sleeve 2160 in a forward direction 2184 and the other spring 2182*b* biases the sleeve 2160 in rearward direction 2186. Alternatively, other components may be used to bias the sleeve 2160 toward the home position shown in FIGS. 19 and 19A.

In the engaged mode of the clutch mechanism (FIGS. 19 and 19A), the first and second sets of balls 2162, 2164 in the sleeve 2160 are engaged, respectively, with the drive lugs 2178 on the first coupling 2156 and the driven lugs 2180 on the second coupling 2158. Accordingly, a rigid connection is provided by the clutch mechanism 2154 to permit torque transfer from the first shaft portion 2030*a* to the second shaft portion 2030*b*. However, in the disengaged mode of the clutch mechanism 2154 (FIGS. 21 and 21A), the first and second sets of balls 2162, 2164 in the sleeve 2160 are positioned, respectively, within the circumferential groove 2166 in the first coupling 2156 and the circumferential groove 2174 in the second coupling 2158. Accordingly, the connection between the first and second shaft portions 2030*a*, 2030*b* is broken because the two sets of balls 2162, 2164 are disengaged from the drive lugs 2178 and the driven lugs 2180, inhibiting torque transfer from the first shaft portion 2030*a* to the second shaft portion 2030*b*.

With reference to FIGS. 20 and 20A, as mentioned above, the clutch mechanism 2154 is also shiftable to a third mode or a "manual torque wrench" mode. In this mode, the sleeve 2160 is shifted away from the home position in a forward direction 2184, maintaining the second set of balls 2164 within the slots 2176 but shifting the first set of balls 2162 into the circumferential groove 2168. Accordingly, the connection between the first and second shaft portions 2030*a*, 2030*b* is broken because the first set of balls 2162 are disengaged from the drive lugs 2178, inhibiting torque transfer from the first shaft portion 2030*a* to the second shaft portion 2030*b*. Furthermore, the sleeve 2160 simultaneously engages a portion of the transmission housing (shown schematically by the oblique lines on the outer periphery of the sleeve 2160) to rotationally lock the sleeve 2160 relative to the transmission housing, rigidly connecting the second shaft portion 2030*b* to the transmission housing to prevent its rotation (and therefore rotation of the remaining components downstream of the second shaft portion 2030*b* ending with the output spindle 26). As such, the output spindle 26 becomes rotationally locked with respect to the main and transmission housings of the tool 2010, permitting the tool 2010 to be used as a manual torque wrench by manually rotating the tool 2010 about the rotational axis 2056 to impart torque to a fastener or workpiece. For example, mating splines on the interior of the transmission housing and exterior of the sleeve 2160 may be engaged to rotationally lock the sleeve 2160 to the transmission housing. Because the transducer assembly 54 is positioned between the second shaft portion 2030*b* and the output spindle 26, the transducer assembly 54 would remain operable to detect the reaction torque applied to the output spindle 26. The manual torque wrench mode therefore allows manual adjustments of the torque exerted on the fastener or workpiece while providing feedback to the user of the tool 2010 of the value of torque applied to the fastener or workpiece with the display device 1057.

In operation, the clutch mechanism 2154 can mechanically limit the amount of torque transferred to the fastener or workpiece and the tool 2010 can provide visual feedback (i.e., through the display device 1057) as to the amount of torque exerted on the fastener or workpiece during each fastener-driving operation. As shown in FIG. 19, the clutch mechanism 2154 is in the engaged mode. To initiate a fastener driving operation, the motor 2018 is activated (e.g., by depressing the trigger 138), which rotates the first shaft portion 2030*a* in the particular direction desired by the user. Because the first set of balls 2162 are engaged with the drive lugs 2168 on the first coupling 2156, torque is transmitted through the sleeve 2160 which, in turn, is transmitted through the second set of balls 2164 and the second coupling 2158 (via engagement of the second set of balls 2164 and the drive lugs 2180). As a result, the second shaft portion 2030*b* is driven in the same direction as the first shaft portion 2030*a* and the sleeve 2060, which then drives the transmission 22 and the output spindle 26. The reaction torque or the "running torque" imparted on the output spindle 26 by the fastener or workpiece is measured by the transducer assembly 54 as the tool bit is driving the fastener or workpiece.

The clutch mechanism 2154 will remain in the engaged mode until the master controller 58 (using input from the torque transducer 54) determines that the running torque has reached a predetermined torque threshold. Then, the clutch mechanism 2154 is actuated from the engaged mode to the disengaged mode, shown in FIGS. 21 and 21A, by the master controller 58. Specifically, the master controller 58 activates the actuator 2183, which shuttles or shifts the sleeve 2160 in the rearward direction 2186 from the home position against the bias of the spring 2182*a*, thereby positioning the first set of balls 2162 in the first circumferential groove 2166 of the first coupling 2156 and the second set of balls 2164 in the circumferential groove 2174 of the second coupling 2158. At the same time, the master controller 58 deactivates the motor 2018 and applies dynamic braking to quickly decelerate the rotation of the first shaft portion 2030*a*. As a result, the connection between the first and second shaft portions 2030*a*, 2030*b* is quickly disconnected, such that torque subsequently produced by the motor 2018 as it is being dynamically braked is prevented from being transmitted beyond the first shaft portion 2030*a*. This increases the overall accuracy of the tool 2010 because torque overrun of the fastener or workpiece is minimized or eliminated. Also, when the clutch mechanism 2154 is actuated from the engaged mode to the disengaged mode, the maximum torque detected by the transducer assembly 54 may be output to the display device 1057 for reference by the user. After the motor 2018 has stopped, the actuator 2183 may release the sleeve 2160, thereby permitting the springs 2182*a*, 2182*b* to bias the sleeve 2160 to the home position in FIGS. 19 and 19A coinciding with the engaged mode of the clutch mechanism 2154 and readying the tool 2010 for a subsequent fastener driving operation.

In some cases, the torque actually applied to a fastener or workpiece (as indicated by the display device 1057) may be slightly below the desired torque value. In this case, the clutch mechanism 2154 may be shifted to the manual torque wrench mode, shown in FIGS. 20 and 20A, to manually apply additional torque to the fastener or workpiece to achieve the desired torque value. To shift the clutch mechanism 2154 to the torque wrench mode, the master controller 58 is prompted (e.g., by actuation of a momentary switch accessible to the user on the exterior of the tool 2010, not shown) to activate the actuator 2183, which shuttles or shifts the sleeve 2160 in a forward direction 2184 from the home position against the bias of the spring 2182*b*, thereby positioning the first set of balls 2162 within the second circumferential groove 2168 of the first coupling 2156, but maintaining the second set of balls 2164 within the slots 2176. As a result, the connection between the first and second shaft portions 2030*a*, 2030*b* is quickly disconnected, thereby inhibiting torque transfer from the motor 2018 to the output spindle 2026. Simultaneously, the sleeve 2160 becomes rotationally constrained by the transmission housing to effectively lock rotation of the second shaft portion 2030*b* and the downstream rotating components of the tool 2010 (including the output spindle 26) to the transmission housing. After manually rotating the tool 2010 to achieve the desired torque value, the switch may be released, deactivating the actuator 2183 and permitting the sleeve 2160 to return to the home position under action of the springs 2182*a*, 2182*b*.

In general, motors are a large contributor to the kinetic energy of a power tool. The large amount of kinetic energy makes it difficult to precisely control delivered torque output, particularly, in hard or high stiffness joints. Furthermore, electronically braking the motor fails to fully dissipate the kinetic energy, often resulting in over-torqued fasteners. The clutch mechanisms 1010, 2010 are designed for high-precision tightening sequences and reduce the risk of torque overshoots by coupling and decoupling the motor from the remainder of the gear train.

Figure 22:
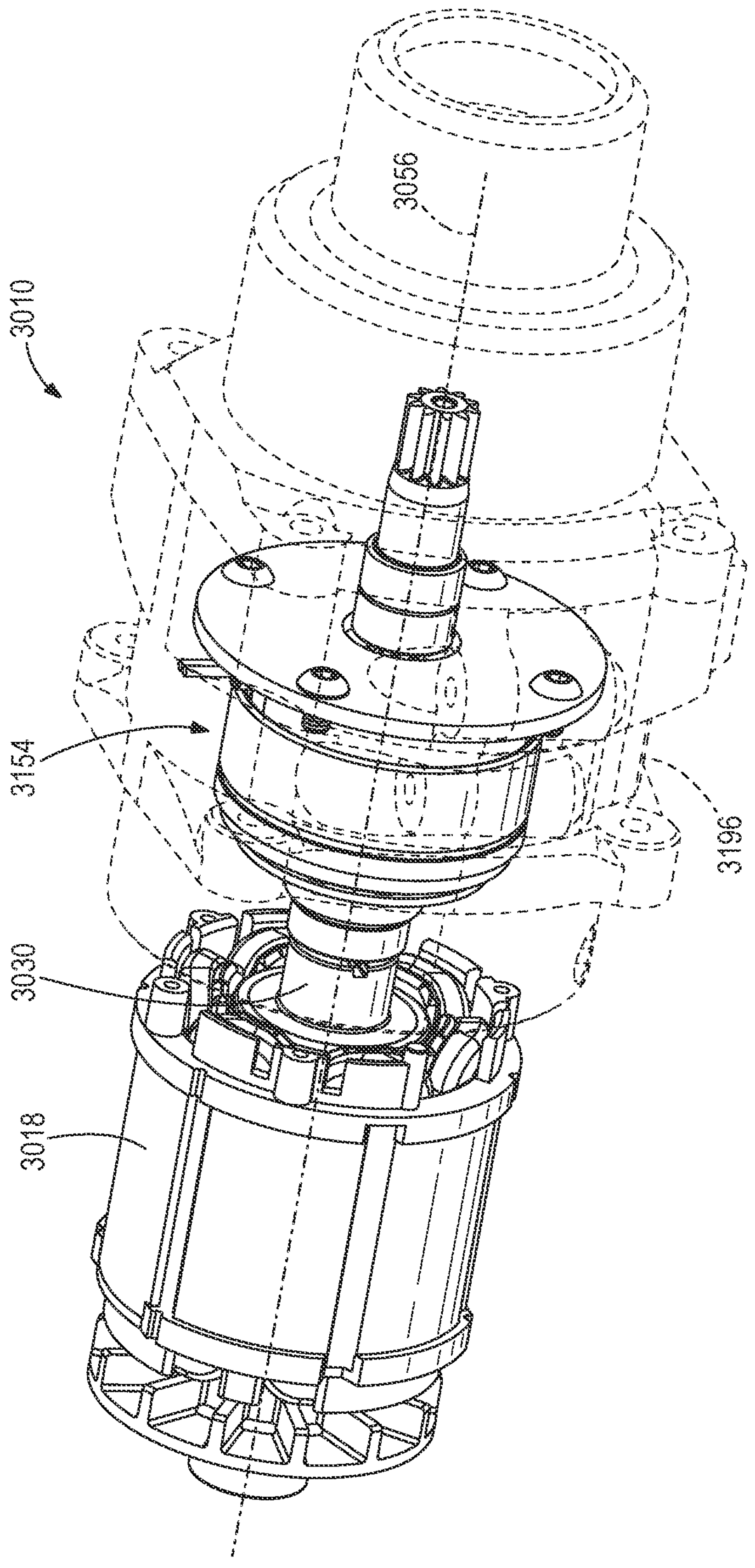
FIG. 22 is a perspective view of a portion of a rotary power tool incorporating a clutch mechanism in accordance with another embodiment of the invention.

FIG. 22 illustrates a portion of a power tool 3010 in accordance with another embodiment of the invention. The power tool 3010 includes a clutch mechanism 3154, but is otherwise similar to the power tool 2010 described above with reference to FIGS. 1-21, with like components being shown with like reference numerals plus 3000. Only the differences between the power tools 10, 3010 are described below.

Figure 23:
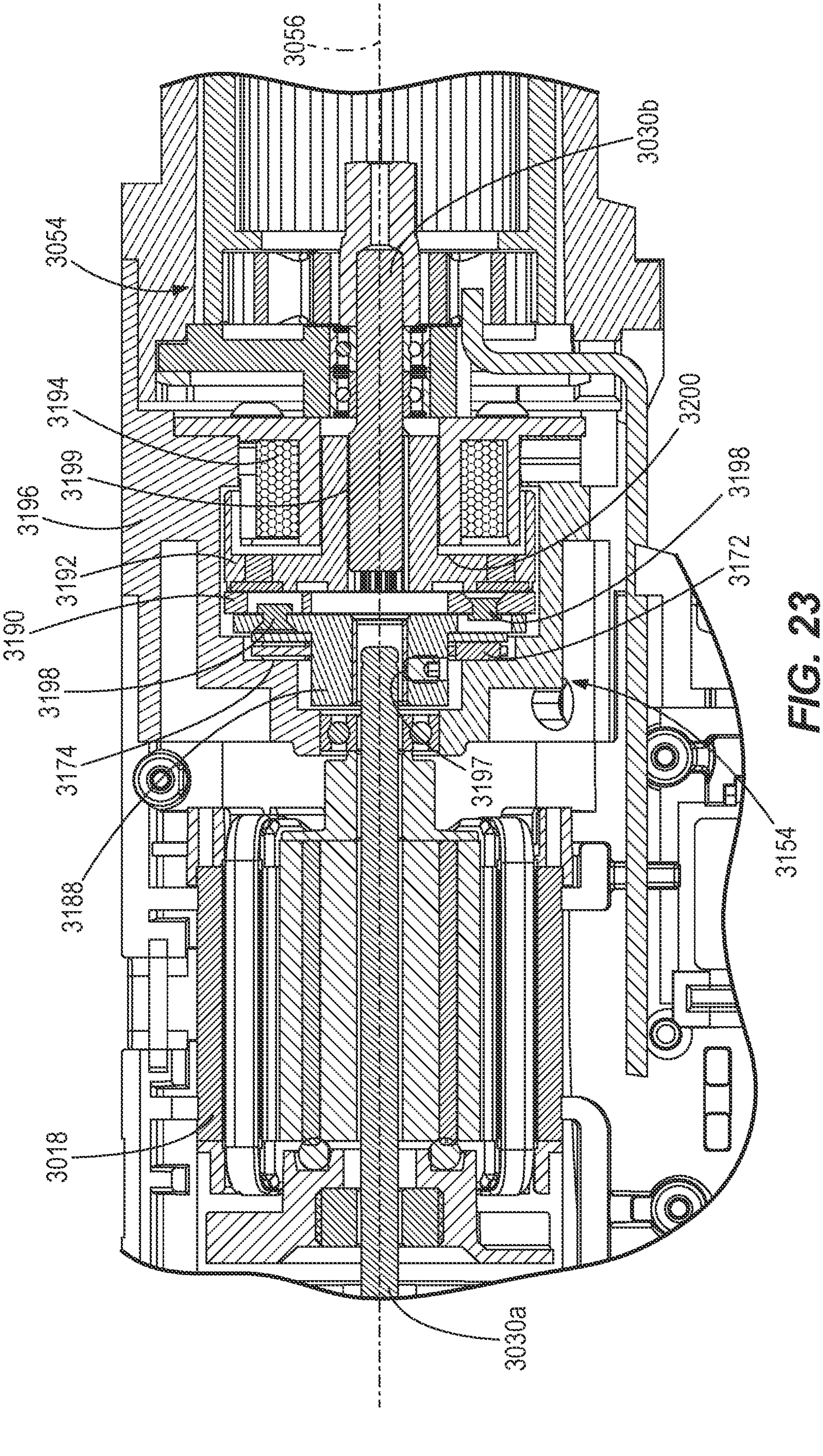
FIG. 23 is a cross-sectional view of the rotary tool of FIG. 22.

With reference to FIGS. 22 and 23, the power tool 3010 includes a brushless electric motor 3018 having a drive shaft 3030 for providing a rotational input to a multi-stage planetary transmission (e.g., transmission 22; FIG. 2). As shown in FIG. 23, the drive shaft 3030 is formed as two pieces—a first shaft portion 3030*a* extending from an armature of the motor 3018 and a second shaft portion 3030*b* meshed with the transmission. As explained in detail below, the first and second shaft portions 3030*a*, 3030*b* selectively co-rotate such that, in one manner of operation, the first shaft portion 3030*a* transmits torque to the second shaft portion 3030*b*, and in another manner of operation, the first shaft portion 3030*a* rotates independently of the second shaft portion 3030*b* to thereby divert torque from the second shaft portion 3030*b* and the transmission.

The tool 3010 also includes a transducer assembly 3054, which is identical to the transducer assembly 54 described above, positioned inline and coaxial with a rotational axis 3056 of the motor 3018, and between the transmission and the motor 3018. The transducer assembly 3054 detects the torque output by the spindle of the tool 3010 (not shown, but identical to the spindle 26 described above) and interfaces with a display device 1057 (i.e., through a high-level or master controller 58, shown in FIG. 2) to display the numerical torque value output by the spindle 26 for each fastener-driving operation. In contrast to the power tool 10, the transducer assembly 3054 of the tool 3010 does not interface with the motor 3018 to control the rotational speed of the motor 3018 as the torque output approaches a predefined torque value or torque threshold. Instead, the transducer assembly 3054 interfaces with the clutch mechanism 3154 to inhibit torque output to the workpiece from exceeding the torque threshold.

In the illustrated embodiment of FIGS. 22 and 23, the clutch mechanism (hereinafter referred to as an "electromechanical clutch" 3154) is capable of separating the motor 3018 and the transmission to inhibit kinetic energy of the motor 3018 from transferring to the transmission. The electromechanical clutch 3154 is positioned between the first shaft portion 3030*a* and the second shaft portion 3030*b*, and is electronically controlled by a master controller (e.g., master controller 58 described above) using input from the transducer assembly 3054. The electromechanical clutch 3154 is shiftable between an engaged mode (FIGS. 22 and 23), in which the electromechanical clutch 3154 interconnects the first and second shaft portions 3030*a*, 3030*b* to permit torque transfer therebetween, and a disengaged mode (not shown), in which the electromechanical clutch 3154 rotationally disconnects the shaft portions 3030*a*, 3030*b* to inhibit torque transfer therebetween. As such, the electromechanical clutch 3154 is capable of selectively diverting torque away from the output spindle 26 when the reaction torque on the spindle 26 detected by the torque transducer 3054 exceeds the predetermined torque threshold.

Figure 24:
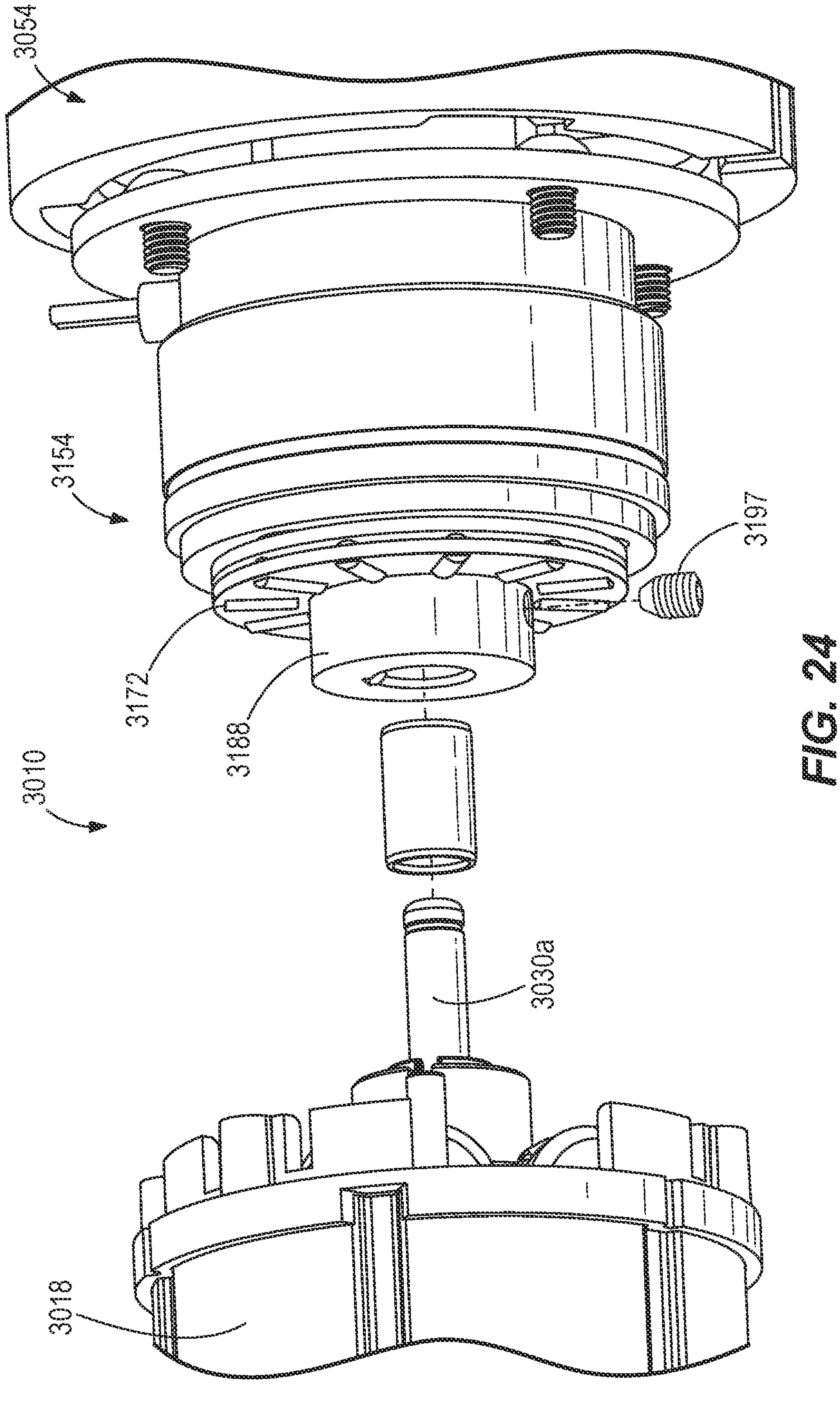
FIG. 24 is an enlarged perspective view of the clutch mechanism of FIG. 22.

With reference to FIG. 23, the electromechanical clutch 3154 includes a rotor 3188 fixedly mounted to the first shaft portion 3030*a*, a brake pad 3190 coupled for co-rotation with the rotor 3188, an armature 3192 slidably coupled to the second shaft portion 3030*b*, a field or coil 3194 wrapped around the armature 3192 for selectively creating an electromagnetic field, and a clutch housing 3196 enclosing all of the foregoing components of the clutch 3154. The rotor 3188 is composed of a ferromagnetic material and is coupled for co-rotation with the first shaft portion 3030*a* using mating non-circular cross-sectional profiles on the rotor 3188 and the first shaft portion 3030*a*, respectively. Additionally, the rotor 3188 is axially retained to the first shaft portion 3030*a* by a set screw 3197 (FIG. 24). In other embodiments, the rotor 3188 may be spline-fit onto the first shaft portion 3030*a* having a corresponding spline region. A thrust bearing 3172 is positioned between an inward-extending annular wall 3174 of the clutch housing 3196 and the rotor 3188 to facilitate rotation of the rotor 3188 relative to the housing 3196. Fasteners 3198 are received within corresponding apertures in the rotor 3188 and the brake pad 3190 to connect the rotor 3188 and the brake pad 3190. Although the fasteners 3198 are shown as rivets, in other embodiments, the fasteners 3198 may alternatively be screws, bolts, pins, or other suitable fasteners.

Referring to FIG. 23, the armature 3192 is also composed of a ferromagnetic material. The armature 3192 is spline-fit to a corresponding spline region 3199 of the second shaft portion 3030*b*, thereby permitting the armature 3192 to be axially moveable relative to the second shaft portion 3030*b*. Furthermore, the armature 3192 includes a circumferential groove 3200 extending through the rotor-facing surface of the armature 3192. A cast-in process fills the circumferential groove 3200 with a material different from the ferromagnetic material of the armature 3192. The material disposed within the groove 3200 has high coefficient of friction properties such that a relatively large amount of force is required to slide an object (e.g., the brake pad 3190) against the material disposed within the groove 3200. Similarly, the armature-facing surface of the brake pad 3190 is composed of a material having a high coefficient of friction. Consequently, when the brake pad 3190 and the armature 3192 contact each other, a large frictional force is generated, thereby ensuring rapid torque transfer from the rotor 3188 to the armature 3192 (or the first shaft portion 3030*a* to the second shaft portion 3030*b*). In some embodiments, the armature-facing surface of the brake pad 3190 and the rotor-facing surface of the armature 3192 may each include at least one ridge to increase the contact surface area of the mating surfaces.

With continued reference to FIG. 23, energization of the coil 3194 is controlled by the master controller 58 (shown in FIG. 2) using input from the torque transducer 3054. When the coil 3194 is energized, the coil 3194 creates a magnetic field, thereby magnetizing the ferromagnetic material of the rotor 3188 and the ferromagnetic material of the armature 3192. As such, when the electromechanical clutch 3154 is in the engaged mode (FIG. 23), current is applied to the coil 3194, causing the rotor 3188 and the armature 3192 to magnetize which, in turn, engages the armature 3192 and the brake pad 3190. In contrast, when the clutch 3154 is in the disengaged mode (not shown), current is removed from the coil 3194, causing the rotor 3188 and the armature 3192 to demagnetize which, in turn, disengages the armature 3192 and the brake pad 3190. In the disengaged mode, an air gap exists between the brake pad 3190 and the armature 3192. In some embodiments, a biasing member (e.g., a spring, not shown) may be positioned between the brake pad 3190 and the armature 3192 to maintain separation between the brake pad 3190 and the armature 3192 when the electromechanical clutch 3154 is in the disengaged mode.

In operation, the clutch 3154 can limit the amount of torque transferred from the tool 3010 to a fastener. When initiating a fastener driving operation, the coil 3194 is energized and the motor 3018 is activated in response to the user depressing the trigger 138, which rotates the first shaft portion 3030*a* in the particular direction desired by the user. Because the brake pad 3190 is engaged with the armature 3192 in the engaged mode of the clutch 3154, torque is transmitted through the first shaft portion 3030*a* to the second shaft portion 3030*b*. The second shaft portion 3030*b* is driven in the same direction as the first shaft portion 3030*a*, which then drives the transmission 22 and the output spindle 26. The reaction torque or the "running torque" imparted on the output spindle 26 by the fastener or workpiece is measured by the transducer assembly 3054 as the tool bit is driving the fastener.

The electromechanical clutch 3154 will remain in the engaged mode until the master controller 58 (using input from the torque transducer 3054) determines that the running torque has reached a predetermined torque threshold. Then, the electromechanical clutch 3154 is actuated from the engaged mode to the disengaged mode by the master controller 58. Specifically, the master controller 58 removes current from the coil 3194, which demagnetizes the rotor 3188 and the armature 3192, thereby separating the armature 3192 from the brake pad 3190. As a result, the rotational connection between the first and second shaft portions 3030*a*, 3030*b* is quickly disconnected, such that torque subsequently produced by the motor 3018 as it is being dynamically braked is prevented from being transmitted beyond the first shaft portion 3030*a*. This increases the overall accuracy of the tool 3010 because torque overrun of the fastener is reduced or altogether eliminated. After the motor 3018 has stopped, the controller 58 may re-energize the coil 3194, thereby magnetizing the rotor 3188 and the armature 3192, to re-engage the armature 3192 and the brake pad 3190 for readying the tool 3010 for a subsequent fastener driving operation.

The amount of transferable torque permitted by the clutch 3154 can be adjusted by: (1) altering the magnitude of the current applied to the coil 3194; (2) altering the size of ridges on the brake pad 3190 and the armature 3192; (3) increasing the coefficient of friction of the materials on the break pad 3190 and the armature 3192; or any combination thereof. Altering the magnitude of the current applied to the coil 3194 can be programed through the display device 1057 on the tool 3010, the tool's user interface, or through a remote display wirelessly in communication with the tool 3010.

Figure 25:
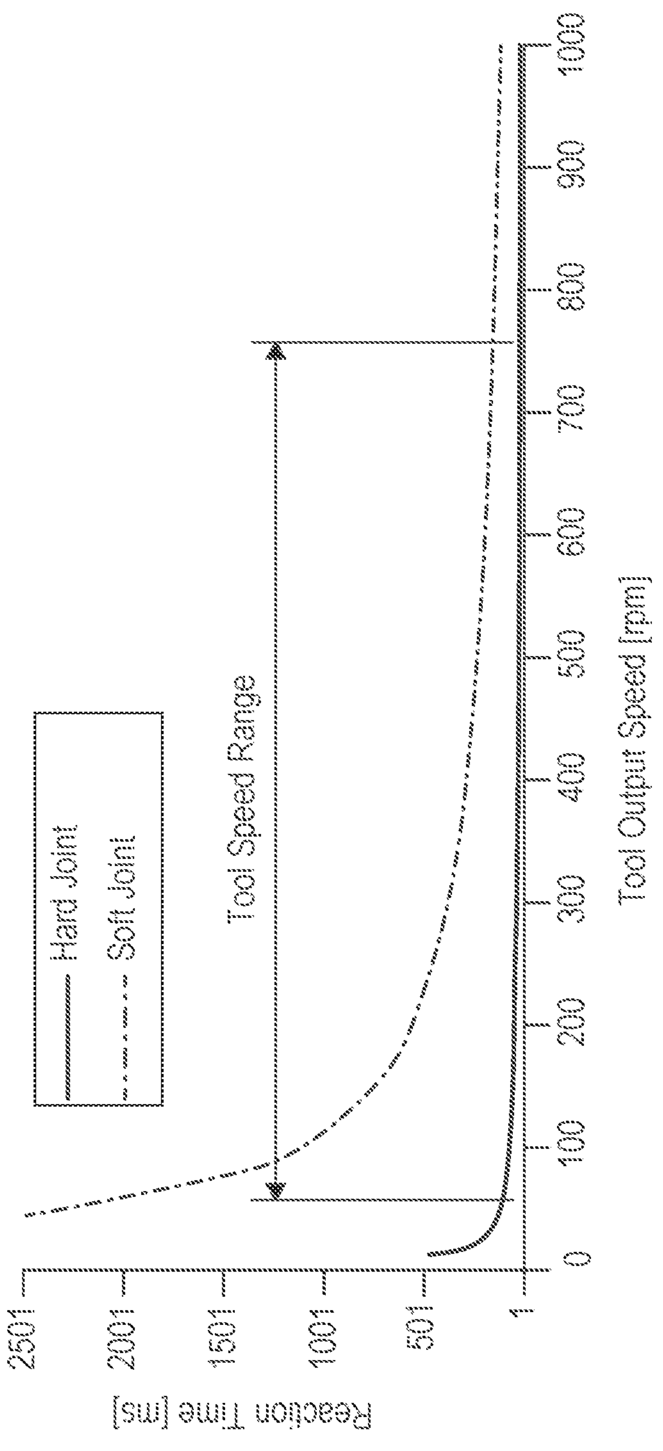
FIG. 25 is a graph of reaction time versus tool output speed during an example fastening sequence for a hard joint and a soft joint using the rotary power tool of FIG. 22.
Figure 26:
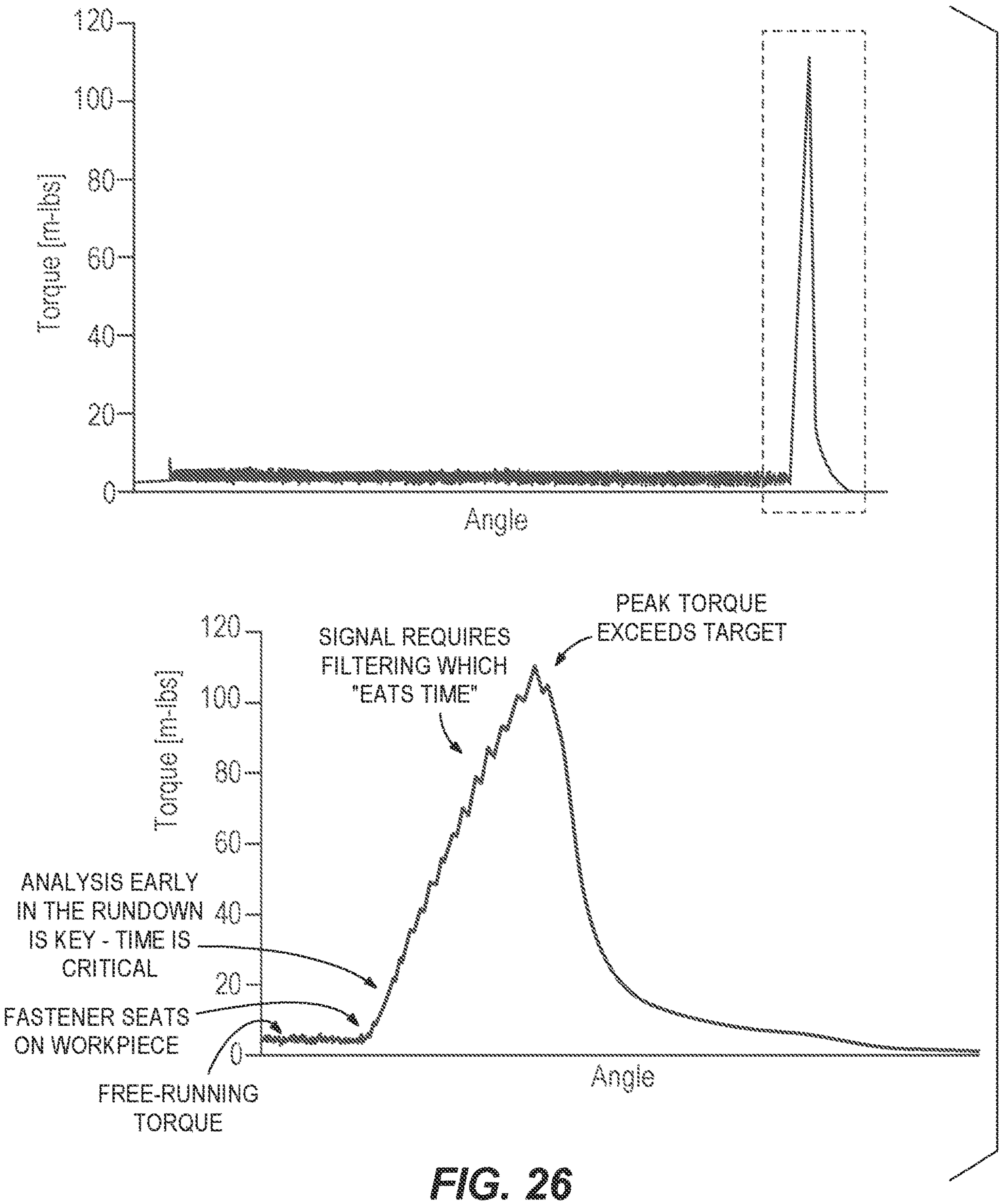
FIG. 26 is a graph of torque versus rotation angle during an example fastening sequence using the rotary power tool of FIG. 22.

As shown in FIG. 25, torque overrun on the fastener or workpiece element varies greatly depending on the type of joint (e.g., a hard joint or soft joint) being fastened. Common factors of torque overrun includes delayed reaction time of when the motor is deactivated and the amount of time it takes for the motor to stop. Therefore, it is beneficial to decouple the motor from the transmission since at least 90% of a rotary power tool's kinetic energy is generated from the motor. Another way to combat torque overrun is to detect, as early as possible, the moment when the fastener is seated. FIG. 26 illustrates a typical bolt torque profile, in which torque versus rotation angle is measured during a fastening sequence. The torque exerted on the fastener increases as the fastener is seated, which is one reason why early detection is critical. Signal filtering of the measured torque via the controller can delay the reaction time of the controller, thereby further increasing the torque on the fastener until the peak torque exceeds the target. The electromechanical clutch 3154 assists in avoiding torque overruns, such as those described above, on a fastener.

Various features of the invention are set forth in the following claims.

What is claimed is:

1. A transducer assembly for use in a power tool including a housing, a motor, an output shaft that drives a workpiece about a central axis, and a transmission for transferring torque from the motor to the output shaft, the transducer assembly comprising:

a transducer positioned between the motor and the transmission, the transducer including an inner hub having an aperture that is offset from the central axis, the inner hub being one of either rotationally affixed to the housing or affixed to a rotatable component of the transmission via mechanical interference with the aperture, an outer rim spaced radially outward from the inner hub, the outer rim being the other of rotationally affixed to the housing or affixed to the rotatable component of the transmission, such that one of either the inner hub or the outer rim is configured to rotate relative to the other of the inner hub or the outer rim, a plurality of flexible webs extending outward from the inner hub to the outer rim, and a sensor affixed to each of the flexible webs for detecting strain of each of the flexible webs in response to a reaction torque applied to the transmission from the output shaft.

2. The transducer assembly of claim 1, wherein the inner hub of the transducer includes a central aperture coaxial with the central axis that surrounds a drive shaft of the motor.

3. The transducer assembly of claim 1, wherein aperture is a first aperture and the inner hub of the transducer further includes a second aperture, the first aperture and the second aperture are radially offset from the central axis in opposite directions, the first aperture and the second aperture receive a bracket that is rotationally affixed to the housing, thereby inhibiting rotational movement of the inner hub.

4. The transducer assembly of claim 3, wherein the bracket includes a pair of protrusions that extend parallel to the central axis, wherein the protrusions are received within the respective apertures in the transducer.

5. The transducer assembly of claim 4, wherein each of the protrusions includes an arcuate outer periphery that is defined by a first radius, and wherein the first aperture and the second aperture in the transducer each include a wall segment having an arcuate shape defined by a second radius greater than the first radius.

6. The transducer assembly of claim 5, wherein the wall segment is substantially flat.

7. The transducer assembly of claim 5, wherein each of the protrusions is in line contact with the wall segment of each of apertures.

8. The transducer assembly of claim 1, wherein the outer rim of the transducer is generally circular and defines a pair of radially inward-extending slots that each receive a radially extending protrusion affixed to the transmission.

9. The transducer assembly of claim 1, wherein the sensor is a strain gauge configured to output a voltage signal proportional to the magnitude of strain of the flexible web.

10. The transducer assembly of claim 1, wherein the inner hub has a first face and a second face opposing the first face, and the aperture defines a first open end coinciding with the first face and a second open end coinciding with the second face.

11. A rotary power tool comprising:

a housing;

a motor;

an output shaft that receives torque from the motor;

a transmission positioned between the motor and the output shaft;

a protrusion extending parallel to a central axis of the motor, the output shaft, and the transmission, the protrusion is affixed to one of either the housing or a rotatable component of the transmission; and a transducer including an inner hub having a central aperture that surrounds a drive shaft of the motor and an offset aperture that aligns with and receives the protrusion, an outer rim spaced radially outward from the inner hub, such that one of either the inner hub or the outer rim is configured to rotate relative to the other of the inner hub or the outer rim, a flexible web interconnecting the inner hub to the outer rim, and a sensor affixed to the flexible web for detecting strain of the flexible web in response to a reaction torque applied to the transmission from the output shaft.

12. The rotary power tool of claim 11, wherein the protrusion includes an arcuate outer periphery that is in substantial line contact with a wall segment of the offset aperture.

13. The rotary power tool of claim 11, wherein the protrusion is a first protrusion and the offset aperture in the inner hub is a first offset aperture, and wherein the transducer assembly further comprises a second protrusion extending away from the bracket and is oriented parallel to the central axis, and a second offset aperture in the inner hub that aligns with and receives the second protrusion.

14. The rotary power tool of claim 13, wherein the first and second protrusions are radially offset from the central axis in opposite directions, and wherein the first and second offset apertures are radially offset from the central axis in opposite directions.

15. The rotary power tool of claim 11, further comprising:

a radially extending slot defined in one of the rotatable transmission component and the outer rim; and a radially extending protrusion affixed to the other of the rotatable transmission component and the outer rim, the protrusion being in substantially line contact with a wall segment at least partially defining the slot.

16. The rotary power tool of claim 15, wherein the offset aperture of the inner hub is angularly offset from the radially extending slot by an angle of 90 degrees.

17. The rotary power tool of claim 11, wherein the inner hub defines a first thickness, the outer rim defines a second thickness that is the same as the first thickness, and the flexible web defines a third thickness that is less than the first and second thicknesses.

18. The rotary power tool of claim 11, wherein the sensor is a strain gauge configured to output a voltage signal proportional to the magnitude of strain of the flexible web.

19. The rotary power tool of claim 18, further comprising a controller in electrical communication with the strain gauge for receiving and calibrating the voltage signal to a measure of reaction torque applied to the outer rim during operation of the power tool.

20. The rotary power tool of claim 11, wherein the inner hub has a first face and a second face opposing the first face, and the offset aperture defines a first open end coinciding with the first face and a second open end coinciding with the second face.

* * * * *